Nov. 26, 1963 L. A. KAMENTSKY 3,112,468

CHARACTER RECOGNITION SYSTEM

Filed April 14, 1959 14 Sheets-Sheet 1

INVENTOR
L. A. KAMENTSKY
BY Kenneth B Hamlin
ATTORNEY

THE SCAN PATTERN

THE SCAN TIMING

INVENTOR
L. A. KAMENTSKY
BY Kenneth B. Hamlin
ATTORNEY

INVENTOR
L. A. KAMENTSKY
BY Kenneth B. Hamlin
ATTORNEY

INVENTOR
L. A. KAMENTSKY
BY Kenneth B Hamlin
ATTORNEY

INVENTOR
L. A. KAMENTSKY
BY Kenneth B Hamlin
ATTORNEY

INVENTOR
L. A. KAMENTSKY
BY Kenneth B Hamlin
ATTORNEY

CHARACTER RECOGNITION SYSTEM

INVENTOR
L. A. KAMENTSKY
BY Kenneth B. Hamlin
ATTORNEY

INVENTOR
L. A. KAMENTSKY
BY Kenneth B Hamlin
ATTORNEY

INVENTOR
L. A. KAMENTSKY
BY Kenneth B Hamlin
ATTORNEY

INVENTOR
L. A. KAMENTSKY
BY Kenneth B. Hamlin
ATTORNEY

INVENTOR
L. A. KAMENTSKY
BY Kenneth B Hamlin
ATTORNEY

Nov. 26, 1963 L. A. KAMENTSKY 3,112,468

CHARACTER RECOGNITION SYSTEM

Filed April 14, 1959 14 Sheets-Sheet 12

INVENTOR
L. A. KAMENTSKY
BY Kenneth B Hamlin
ATTORNEY

INVENTOR
L. A. KAMENTSKY
BY Kenneth B Hamlin
ATTORNEY

INVENTOR
L. A. KAMENTSKY
BY Kenneth B Hamlin
ATTORNEY 3,112,468
CHARACTER RECOGNITION SYSTEM Louis A. Kamentsky, Plainfield, N.J., assignor to Bell Telephone Laboratories, Incorporated, New York, N.Y., a corporation of New York Filed Apr. 14, 1959, Ser. No. 806,255
31 Claims. (Cl. 340—146.3)

This invention relates to pattern recognition systems and more specifically to methods and apparatus for automatically reading printed and handwritten characters.

Many systems have been proposed heretofore for automatically reading printed alphabetical letters and Arabic numerals (hereinafter referred to as alpha-numeric characters). All of these systems, however, are subject to one or more disadvantages. For example, many of the priorly known systems require accurate positioning of the characters in a scanning field to obtain reliable character recognition. Any misalignment or misplacement of the character within the scanning field will produce erroneous output signals. Some of the systems of the prior art are unable to recognize conventional alpha-numeric characters. The characters to be recognized by these systems must be formed in an unconventional manner which, of course, detracts from their legibility by the human eye. Other known prior art systems which recognize characters of conventional configuration have rigid requirements upon the formation of the characters. In these systems, errors will result in the automatic recognition of the characters if the characters do not precisely conform to a predetermined type font. In general, in these systems, any variation in style, orientation, size or shape of the characters will cause erroneous output signals to be produced. Furthermore, many of the prior art systems require that the characters be printed with a special magnetic or conductive ink which substantially increases the cost of printing. Dirt and spurious marks in the field of the characters, and creases or folds of the paper on which the characters appear, also cause errors in the automatic recognition of the characters.

In one type of character recognition system which may be termed element matching, the field of the character is divided into an array of discrete elements and each element is quantized black or white. In this type of character recognition system where the type and location of the black and white elements of the character field are compared with a standard stored in a permanent memory to determine the identity of the character, a considerable amount of redundant information is obtained. This redundancy of information unnecessarily complicates the logic required to make the identification and, of course, increases the cost and complexity of the character recognition system. In many of the prior art systems the logic required to recognize a printed alpha-numeric character approaches the size and complexity of a modern high speed electronic computer.

With the advent of the modern high speed data processing systems it is imperative that a character recognition system which will operate at a compatible speed be provided to enter alpha-numeric information into the data processing system. A serious disadvantage of the prior art systems is their inability to operate at speeds which will enable these data processing systems to process data at their full capabilities.

One further disadvantage of character recognition systems of the prior art has been their inability to recognize handwritten alphabetical letters and Arabic numerals. Because of the variations in size, shape and orientation between alpha-numeric characters hand written by one person and those hand written by another, the prior art character recognition systems have not been able to recognize these handwritten characters. The copending application, Serial Number 678,213, filed August 14, 1957, of T. L. Dimond, discloses a method of constraining the hand writing of alpha-numeric characters which enables these characters to be read by machines. In situations where the speed of writing is not a critical factor, the method of controlling the hand writing of alpha-numeric characters by forming the characters about a plurality of guide dots as disclosed in the T. L. Dimond application is a simple and accurate method of reducing hand writing to machine language. Where, however, a relatively high speed of writing is required or where relatively small characters are required and reliability of recognition is critical, the hand writing of the character about guide dots requires a degree of dexterity on the part of the writer.

It is an object of the present invention to provide an improved reader for automatically reading printed and handwritten alpha-numeric characters which is not subject to the objections and disadvantages described above.

It is a further object of the present invention to reduce the constraint imposed upon the writer of handwritten machine-readable alpha-numeric characters.

It is also an object of the present invention to alleviate the restrictions heretofore imposed upon the printing of machine-readable alpha-numeric characters.

Further objects of the present invention are to increase the speed and improve the accuracy of the automatic machine reading of printed and handwritten alpha-numeric characters.

Additional objects of the present invention are to reduce the cost and complexity of systems for automatically reading printed or handwritten alpha-numeric characters.

These and other objects of the present invention are attained in a specific embodiment thereof wherein the size, shape and orientation of handwritten alpha-numeric characters are controlled so as to be adapted advantageously for automatic machine reading. Unlike the method of constraint imposed upon the writer in the above-identified copending application of T. L. Dimond where alpha-numeric characters are written about guide dots (two guide dots for Arabic numerals and four guide dots for alphabetical letters), in accordance with the present invention the writer forms the characters in a natural manner with respect to four parallel guide lines. The characters are hand written so as to intersect the two central parallel guide lines, with the space between the first and the second guide lines and the space between the third and the fourth guide lines serving, respectively, as guides for the top and the bottom of the character. Thus the four lines serve as a guide and not as a necessary restriction for the formation of the characters and only control the over-all height of the characters. The same system of guide lines may advantageously be utilized to control machine printing of alpha-numeric characters with the lines serving as guides for the relative location of the characters.

With the machine printing and hand writing of alpha-numeric characters in a form adapted for automatic machine reading, as described above an important aspect of the present invention is directed to the automatic recognition of such characters. This is accomplished in accordance with the present invention by a method which may be referred to as "feature extraction." Thus, by determining line openings or, conversely, line closures, in the character field, by determining the number of corners formed by the lines in the character field, and by determining the location of characterizing segments of lines in the character field, only the essential features of the characters are extracted. Because redundant features are not extracted from the character field, the logic required for recognition is greatly simplified. By determining line closures with respect to more than one point in the character field, significantly greater character information is obtained than from a single point. Thus, in accordance with this aspect of the present invention, a method of scanning is introduced for extracting closure configurations, counting corners and locating characterizing line segments of the alpha-numeric characters handwritten or printed on the parallel guide lines as described above.

In accordance with an illustrative embodiment of the present invention, a flying spot scanner is controlled by logic circuitry to define a plurality of criterion scan areas in a bipolar pattern on the field of the characters. These criterion scan areas extend radially from two centers in the character field, and each is formed by a plurality of radial scans of the light spot of the flying spot scanner. A photo sensitive element detects the light reflected from the character field and identifies the intersection of marks or lines. If a given sweep of the light spot intersects a mark or line, the light intensity reflected to the photo sensitive element is reduced and a signal pulse is generated. Recognition of the characters, in accordance with this aspect of the present invention, requires the generation of a code representing the intersections of the criterion areas with marks for each of a number of positions of the character field under the scanner. This corresponds to a sampling for closures in the character as the character field moves through the scanner pattern. Thus a sequence of codes is generated as the field of the character passes through the scanner. These codes are matched sequentially with parallel sets of allowable and forbidden codes representing each of the possible characters. A character is recognized when all of its allowable codes and none of its forbidden codes match in order the sequence of codes generated by the scanner.

In accordance with another important aspect of the present invention, the integration of the plurality of radial scans of the light spot in each of the radial criterion scan areas is made to distinguish spurious marks from true marks and to filter out local irregularities in line densities and electrical noise. Because a written or printed line represents continuous curves, the photo sensitive element will indicate marks in a number of adjacent radial sweeps within each radial criterion scan area, and logic circuitry controlled by the photo sensitive element indicates the presence of a mark in a particular criterion scan area only after at least "*m*" marks in "*s*" sweeps have been detected. Thus spurious marks do not cause the generation of signal pulses falsely indicating the intersection of a line segment of a character.

An additional aspect of the present invention is directed to the simplification of the logic circuitry required to recognize the scanned characters in the character field by eliminating or reducing the redundant or unnecessary information to be resolved by the logic circuitry in identifying the characters. In accordance with this aspect, the signal pulses generated in response to the detection of line segments in the character field extending longitudinally with respect to the radial criterion scan areas of the scanner pattern are rejected, and only the signal pulses generated in response to the detection of line segments in the character field which transversely intersect the radial criterion scan areas are transmitted to the logic circuitry. Thus the required logic circuitry is reduced and is considerably simplified.

In accordance with a further aspect of the present invention, the two centers of the bipolar scan pattern on the character field from which the radial scans of the light spot emanate are automatically registered on the two central guide lines of the four parallel lines used as a guide for the hand writing or printing of the machine-readable alpha-numeric characters. In the illustrative embodiment of the present invention, a flying spot scanner is programmed to produce a radial scan pattern centered at a first point on the field of the character, then to produce a radial scan pattern centered at a second point on the field of the character at a distance from the first point equal to the spacing between the two central guide lines. This cycle is repeated continuously. If the bipolar scan pattern is centered properly on the two central guide lines, radial scans upward from the upper center and downward from the lower center will each intersect one of the guide lines. If the bipolar scan pattern is improperly centered, some other intersection configuration will occur. A registry photo element with a color filter is utilized with logic circuitry in the illustrative embodiment of the present invention to count these intersections. The scan can be properly centered by translating the configurations of intersections into vertical deflection voltage increments proportional to the miscentering. The above-described registering operation is performed continuously as the field of the characters moves through the scanner pattern, thus the proper position of the characters with respect to the scanner pattern is continuously maintained during the scanning of the character field.

In accordance with still a further aspect of the present invention, after a closed loop in a scanned character is detected, the number of corners in the closed loop is determined and is utilized to distinguish further such characters as a closed-top "4" from "9" or "O" from "D." In accordance with this aspect of the present invention, a sequence of voltage pulses is produced, one for each radial scan from one center of the bipolar scan pattern with the amplitude of each voltage pulse being proportional to the distance from the scan center to the point of intersection of the scan and the closed loop. The envelope of these voltage pulses is a curve which represents the radial distance from the scan center to the closed configuration of the scanned character for each 360 degrees. This curve will have discontinuities or cusps for each of the corners of the closed loop. The voltage pulses are applied to a band-pass filter, the midband frequency of which is set to pass a signal only when a predetermined number of cusps representing corners are present in the envelope of the applied voltage pulses. In this manner a closed-top numeral 4, which has three corners, will produce three cusps in the signal applied to the band-pass filter and may advantageously be distinguished from the numeral 9, which has no corners or perhaps one corner, and will produce at the most one cusp in the signal applied to the band-pass filter.

It is a feature of the present invention that a scanner be controlled to scan repeatedly a character field in a bipolar rotating radial scan pattern.

It is an additional feature of the present invention that a bipolar rotating radial scan pattern generated by a scanner be utilized to define a plurality of radial criterion scan areas emanating from two points in a character field and that each of the radial criterion scan areas be defined by a plurality of radial scans of the scanner.

It is a further feature of the present invention that a scanner be controlled to scan repeatedly a character field in a bipolar rotating radial scan pattern so that the two centers of the bipolar scan pattern are automatically registered on a predetermined two of a plurality of guide lines in the character field which are used to guide the hand writing and machine printing of machine-readable alpha-numeric characters, and that the registration of the bipolar rotating radial scan pattern on the predetermined guide lines be maintained continuously during the scanning of the character field.

It is also a feature of the present invention that the output signals detected by a scanner in a character field for a plurality of adjacent radial sweeps of the scanner be integrated to distinguish spurious marks in the character field from true line segments of the characters.

It is an additional feature of the present invention that the output signal from each radial criterion scan area defined by a bipolar rotating scan pattern be integrated with the output signals for the respective criterion scan areas for a predetermined number of repetitions of the bipolar rotating scan pattern to distinguish the detection of line segments in the character field which extend longitudinally with respect to the radial criterion scan areas from line segments in the character field which transversely intersect the radial criterion scan areas.

It is another feature of the present invention that the number of corners in a character closure be determined and utilized in the automatic recognition of handwritten or machine printed alpha-numeric characters.

The foregoing and other objects and features of the present invention will be more readily understood from the following description of an illustrative embodiment thereof when read with reference to the accompanying drawing in which.

Figure 4:
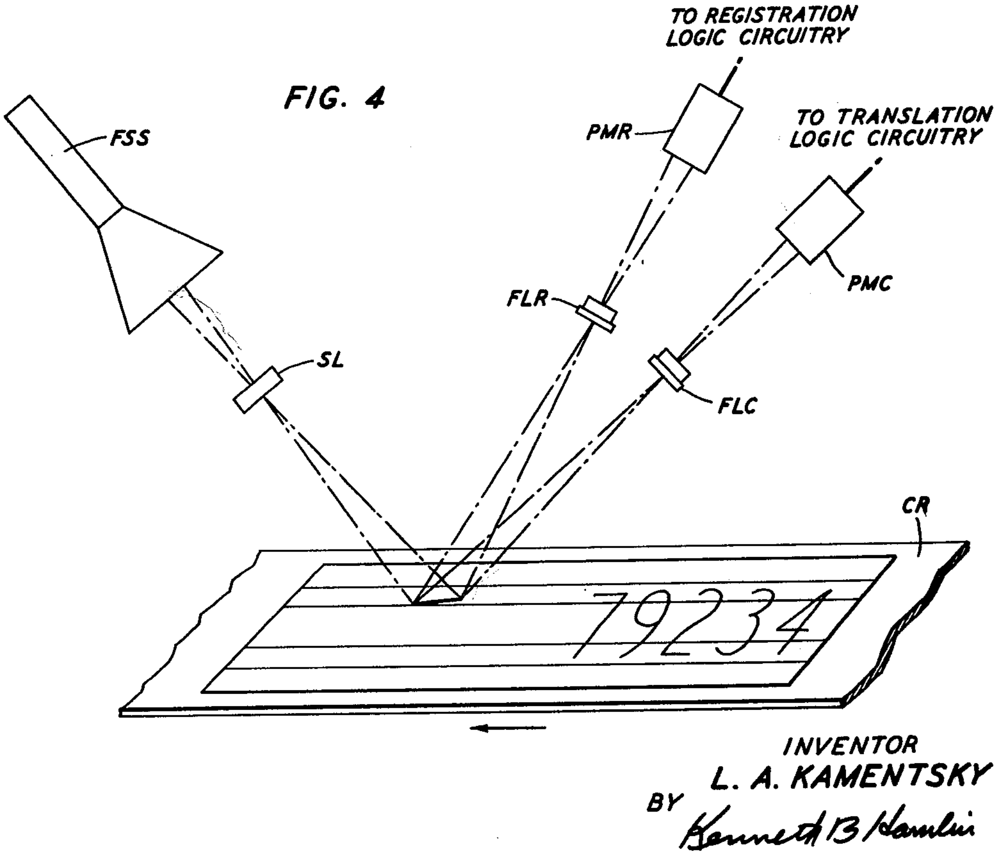
FIG. 4 shows in pictorial form the flying spot scanner, the lens system for focusing the light spot thereof on the paper or form upon which the alpha-numeric characters to be recognized are written, and the lens and color filter systems used to focus the light reflections from the character field to photomultipliers.
Figure 4A:
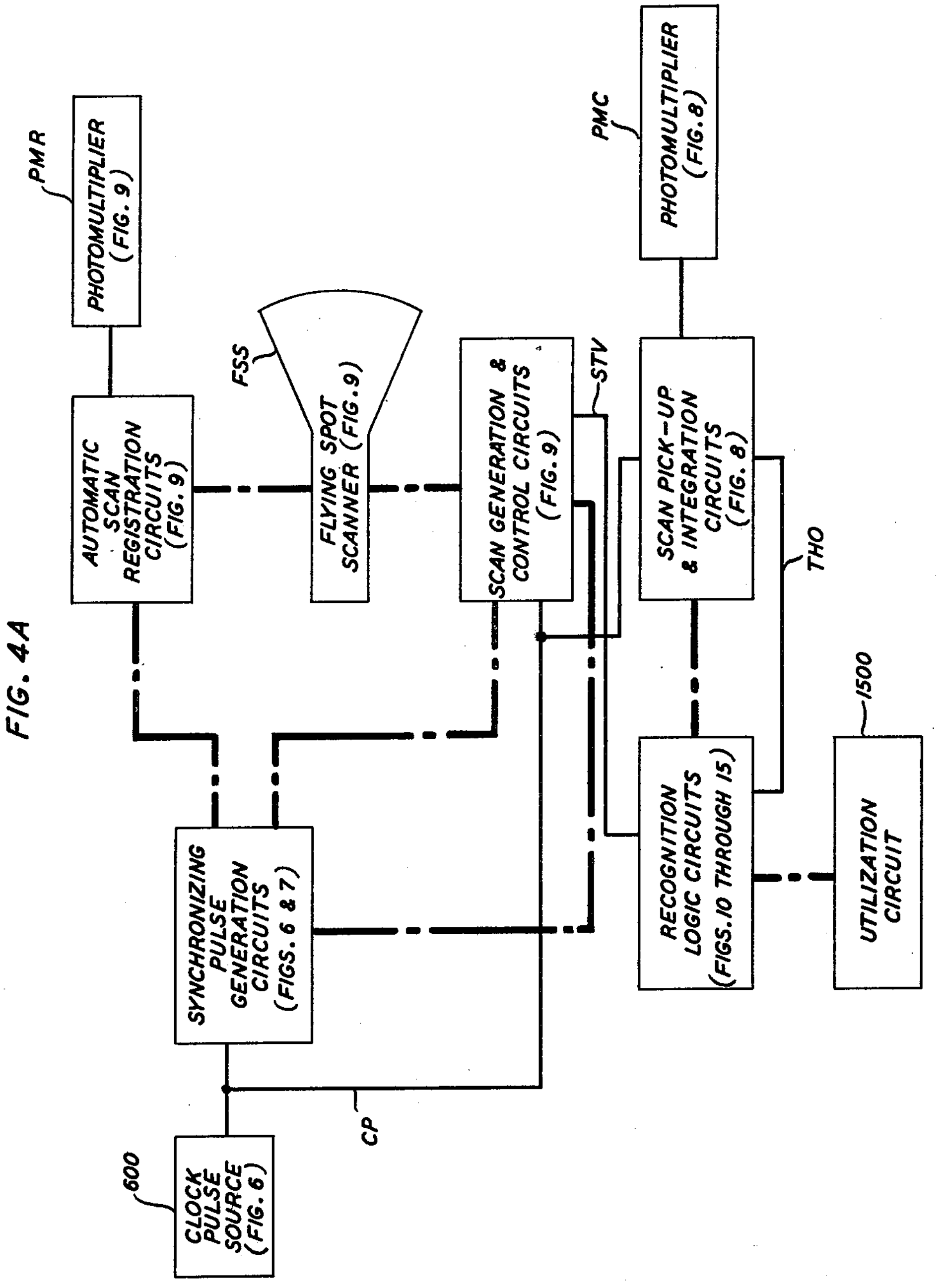
FIG. 4A shows in block diagram form the cooperative relationship between the major components of one illustrative embodiment of the character recognition system of the present invention.
Figure 6:
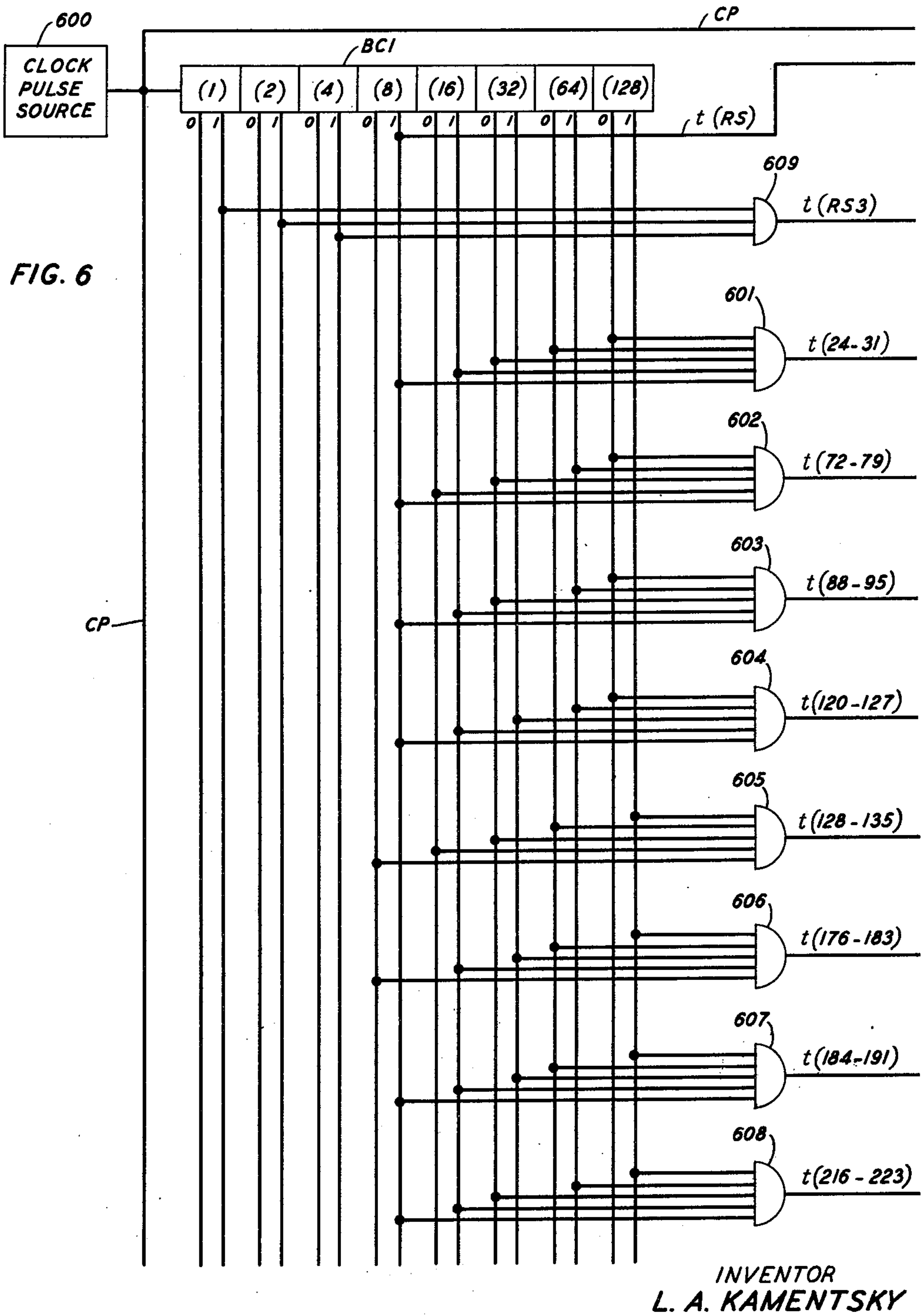
Figure 7:
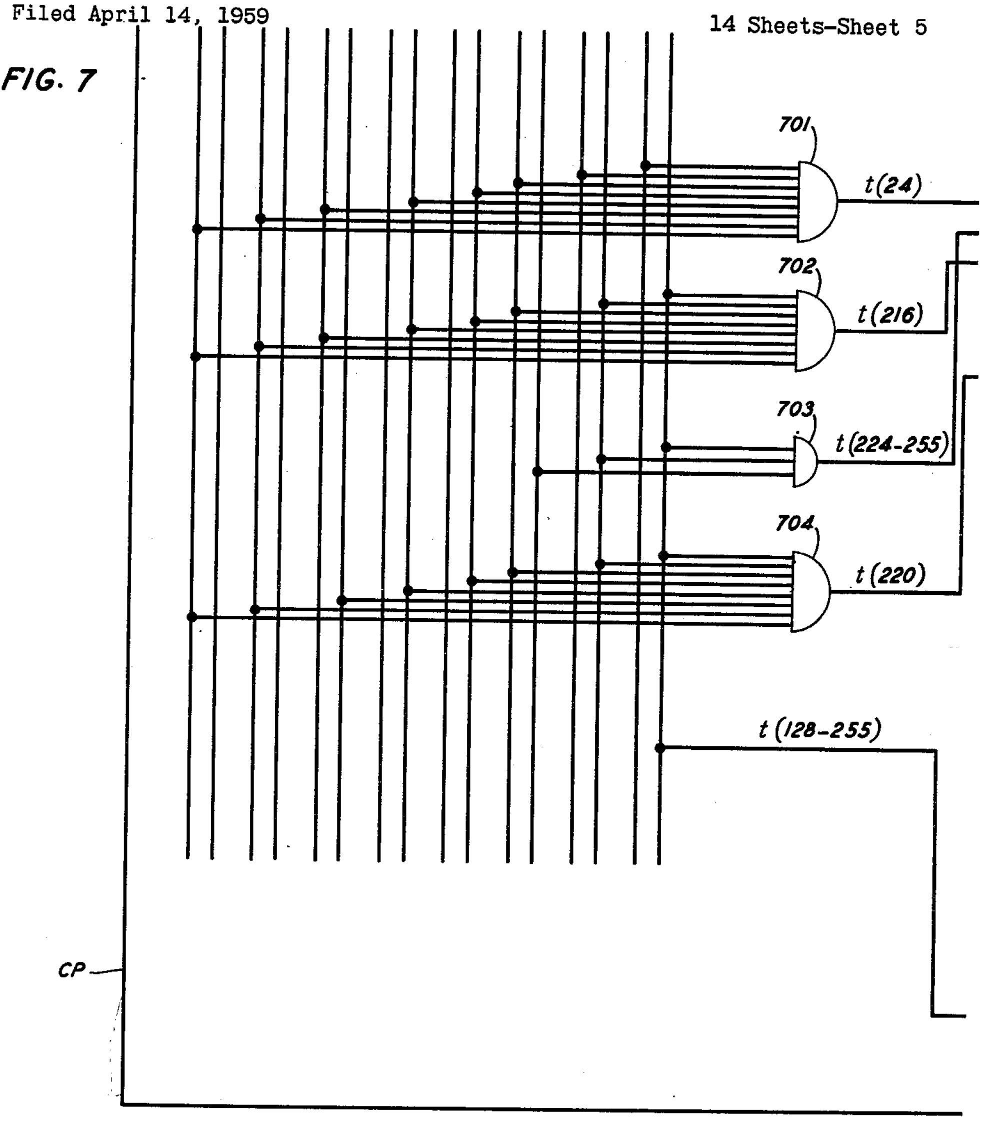
Figure 8:
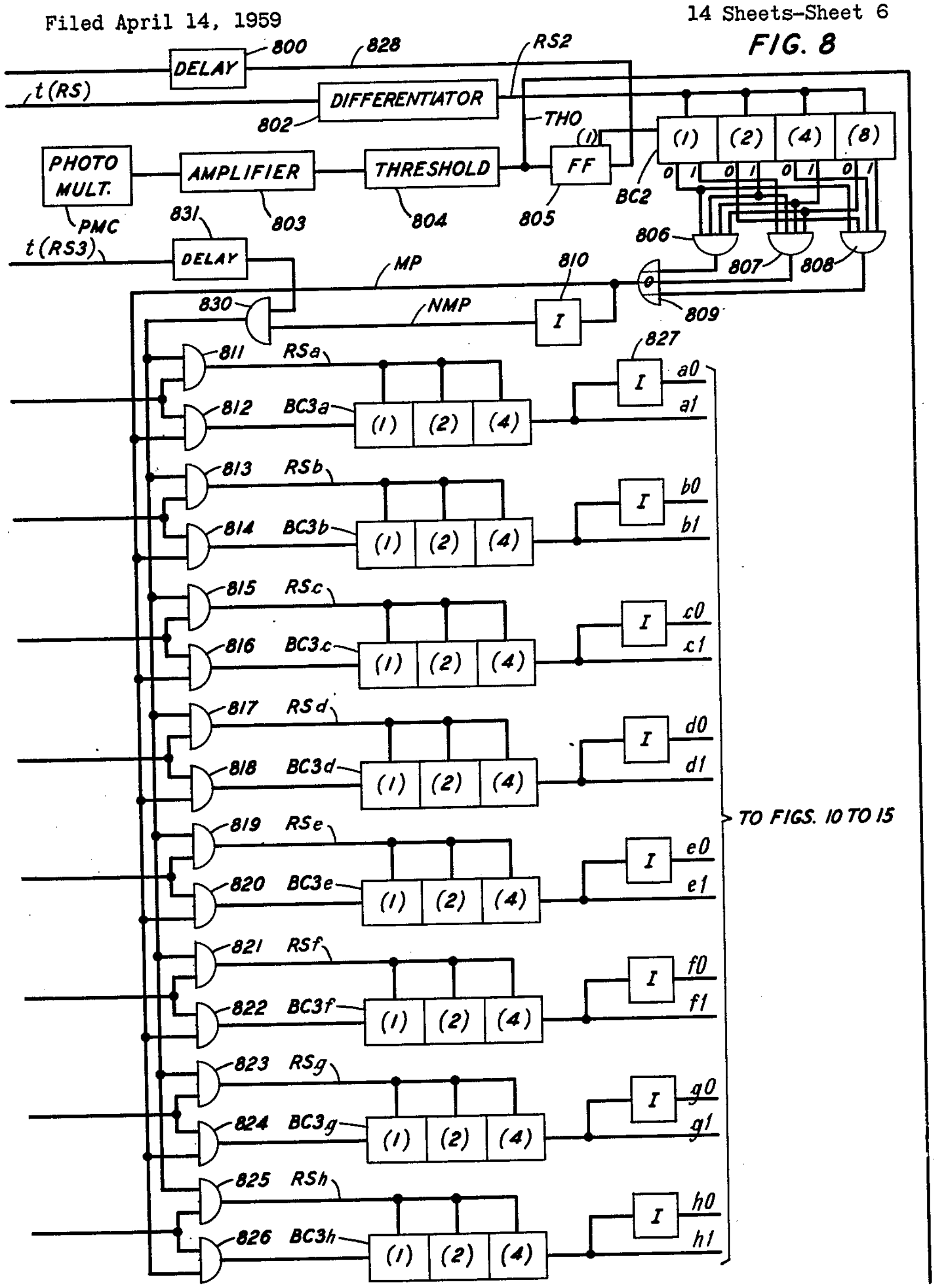
Figure 9:
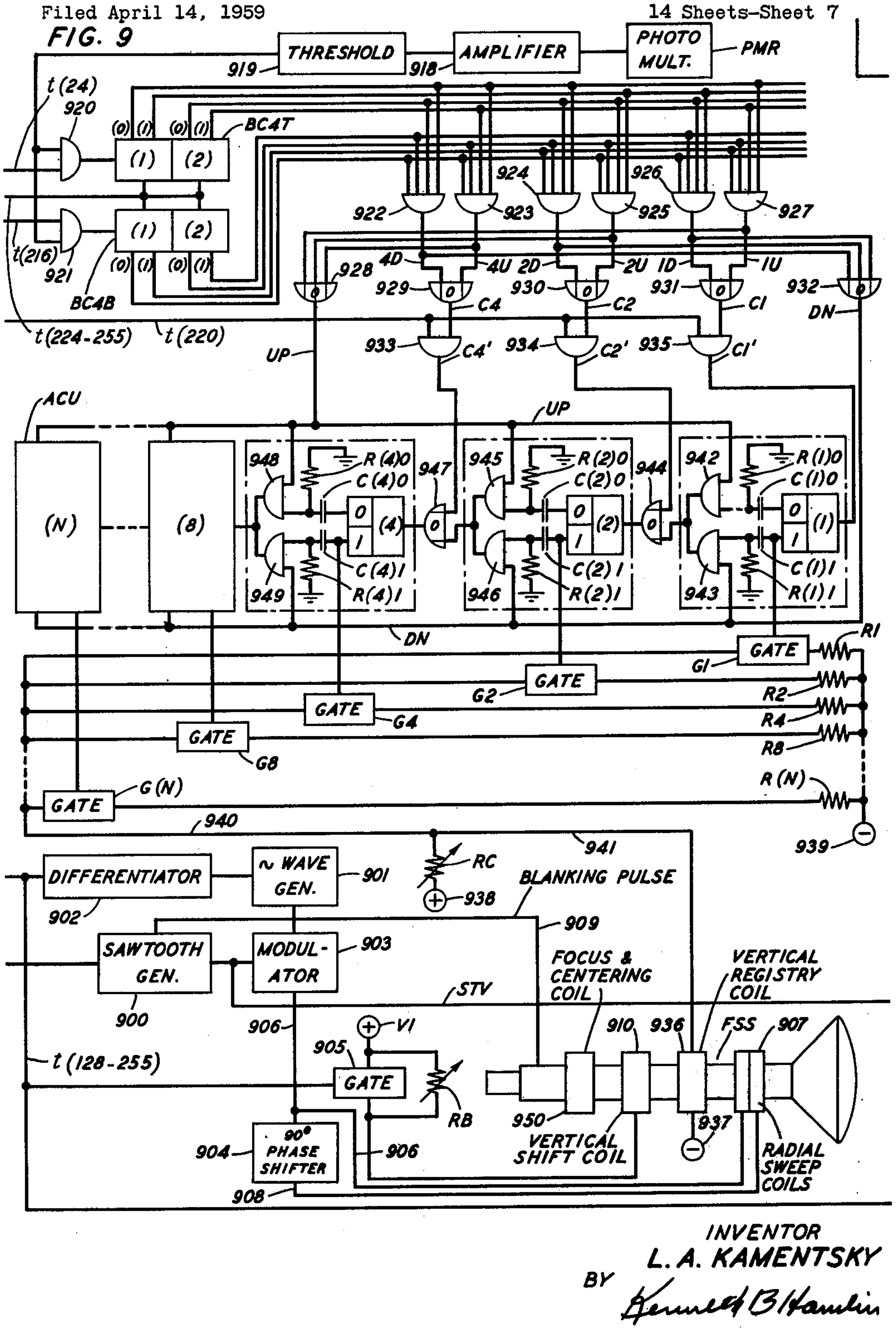
Figure 10:
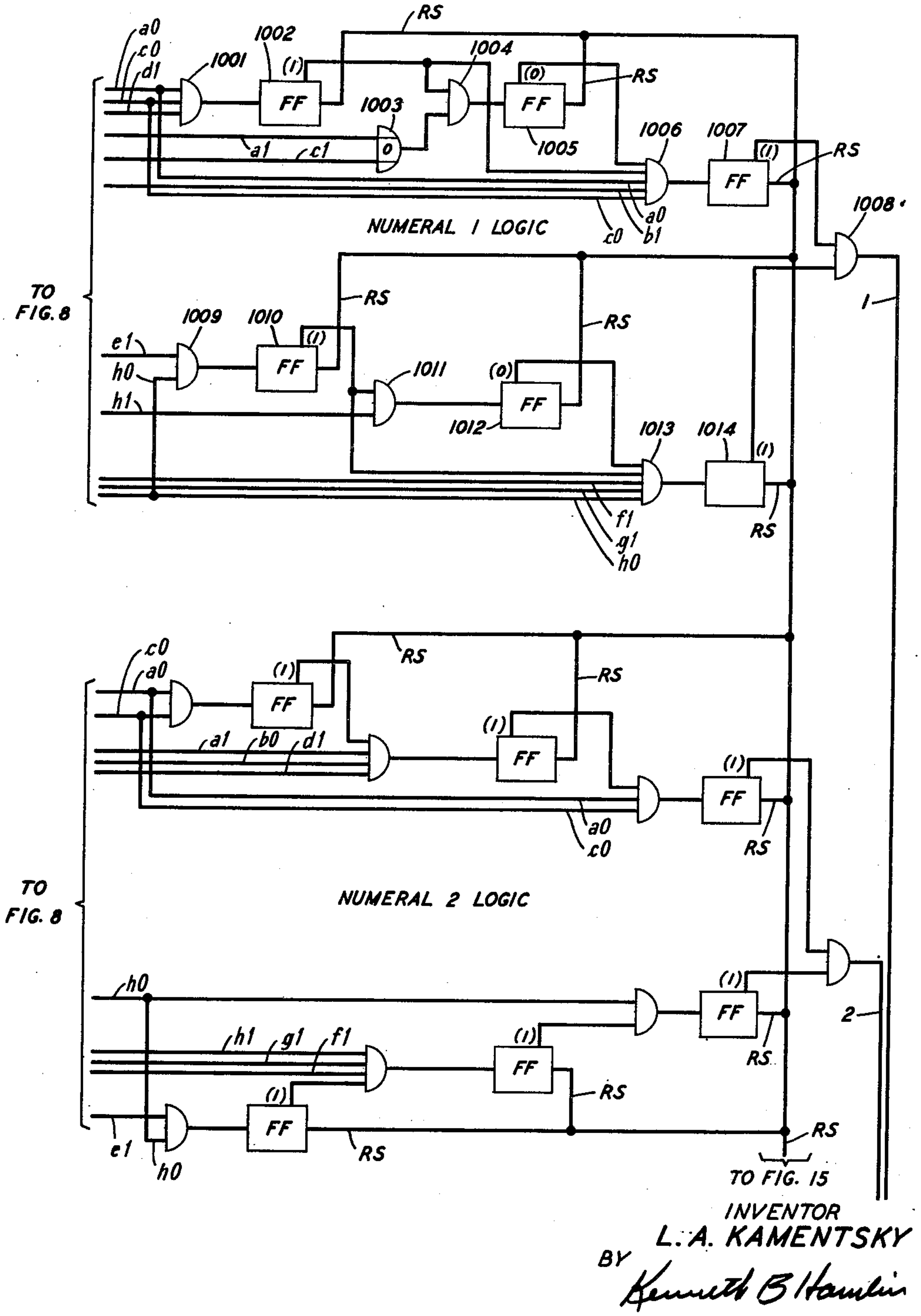
Figure 11:
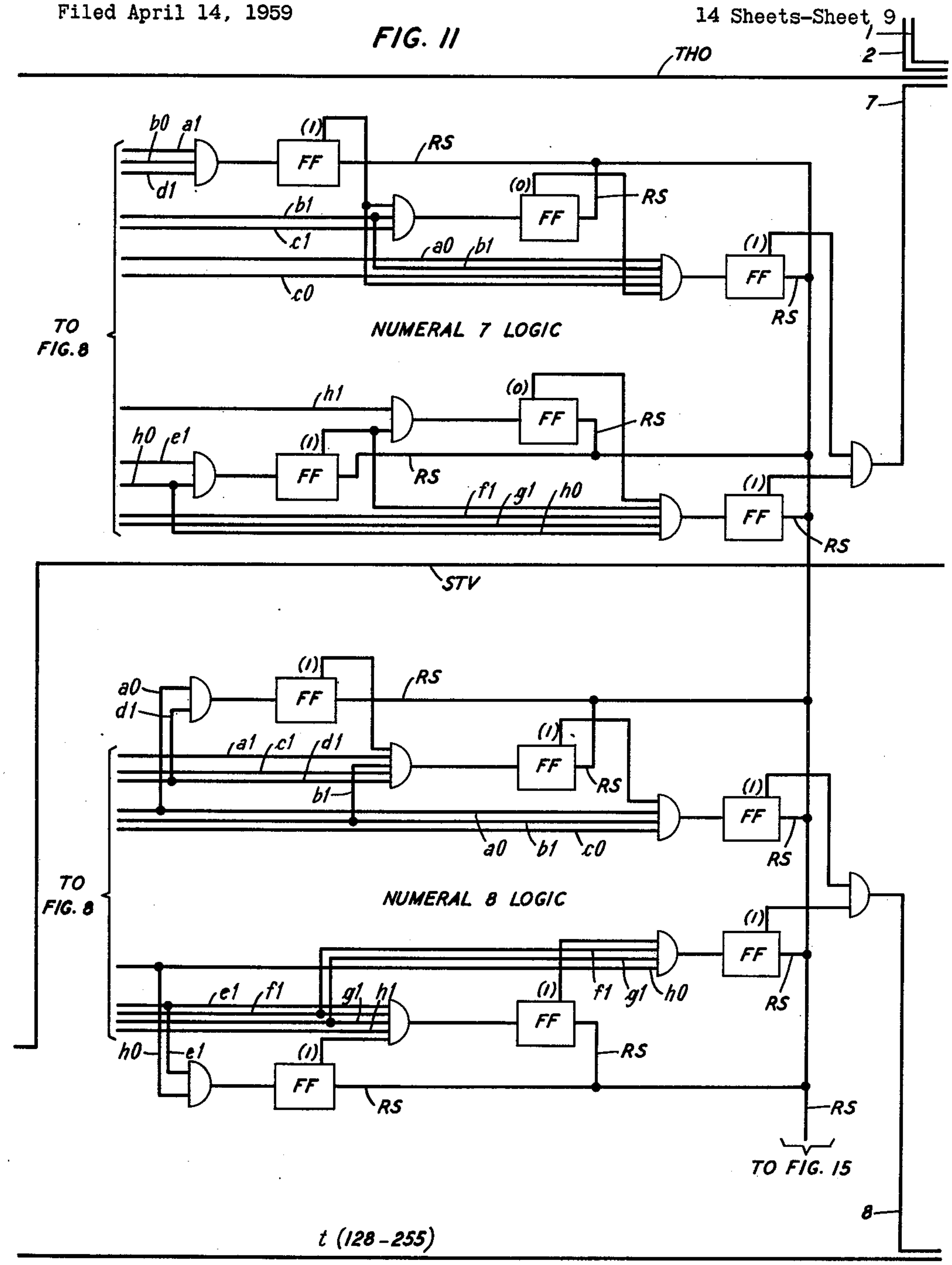
Figure 12:
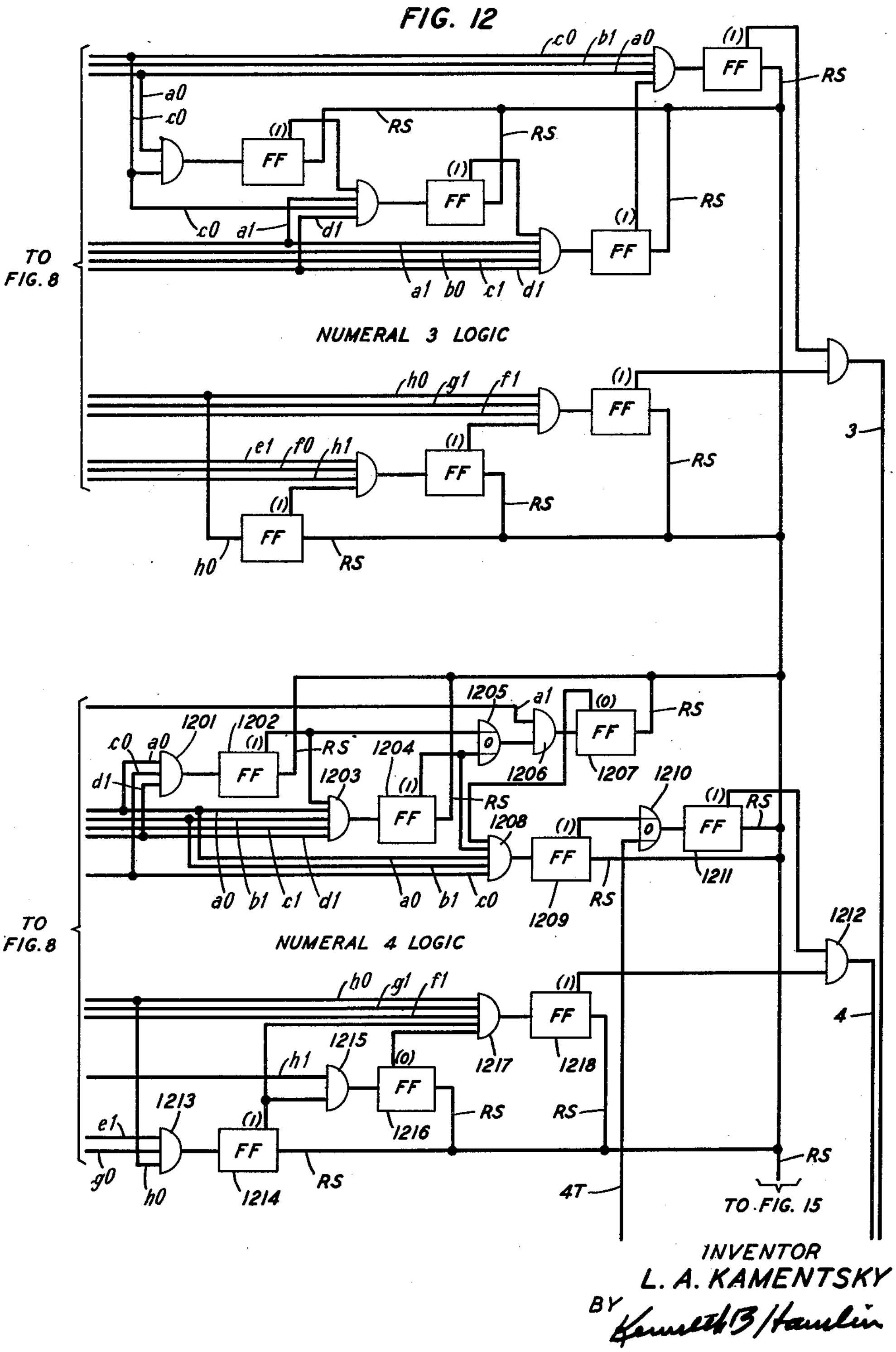
Figure 13:
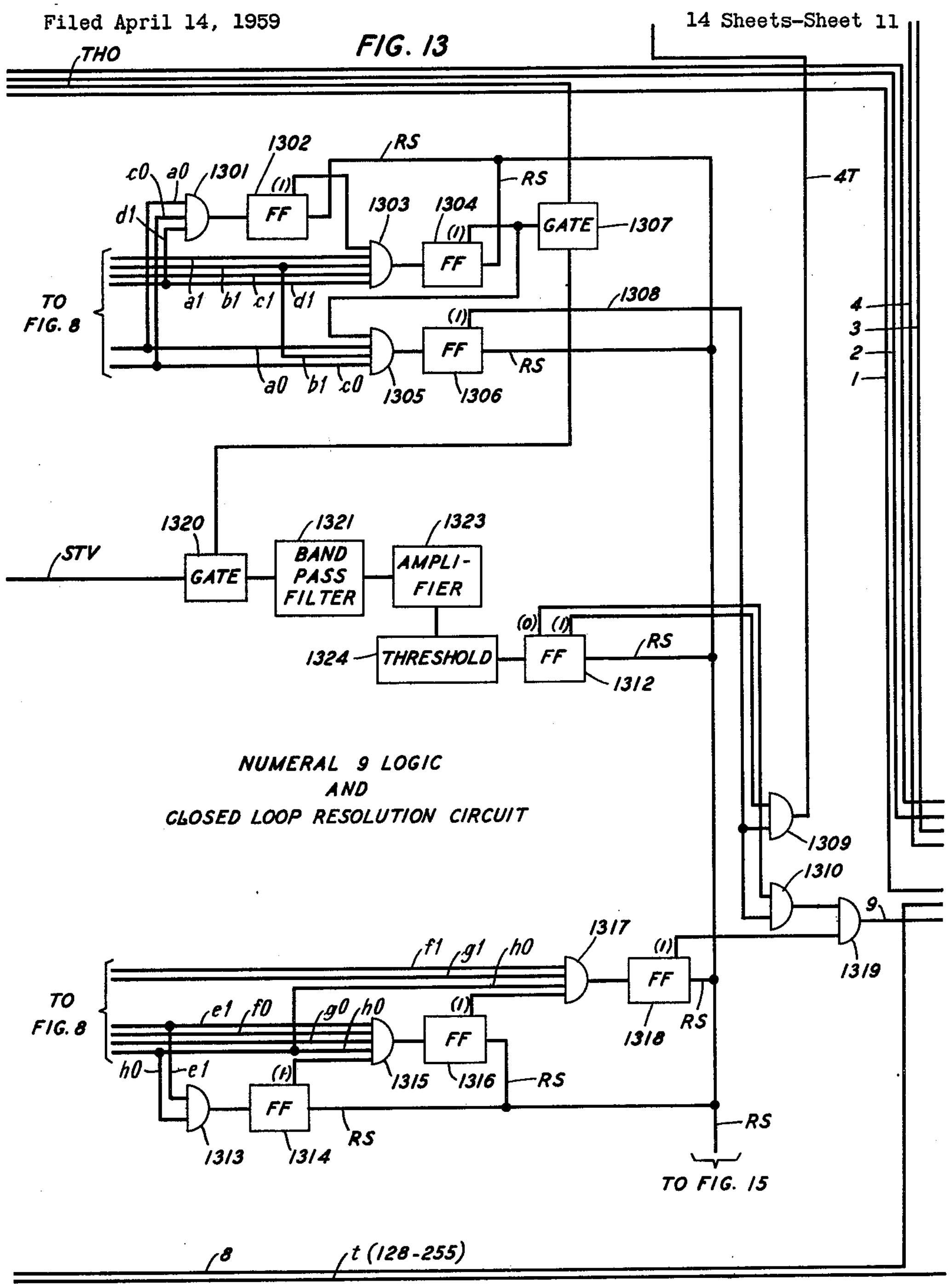
Figure 14:
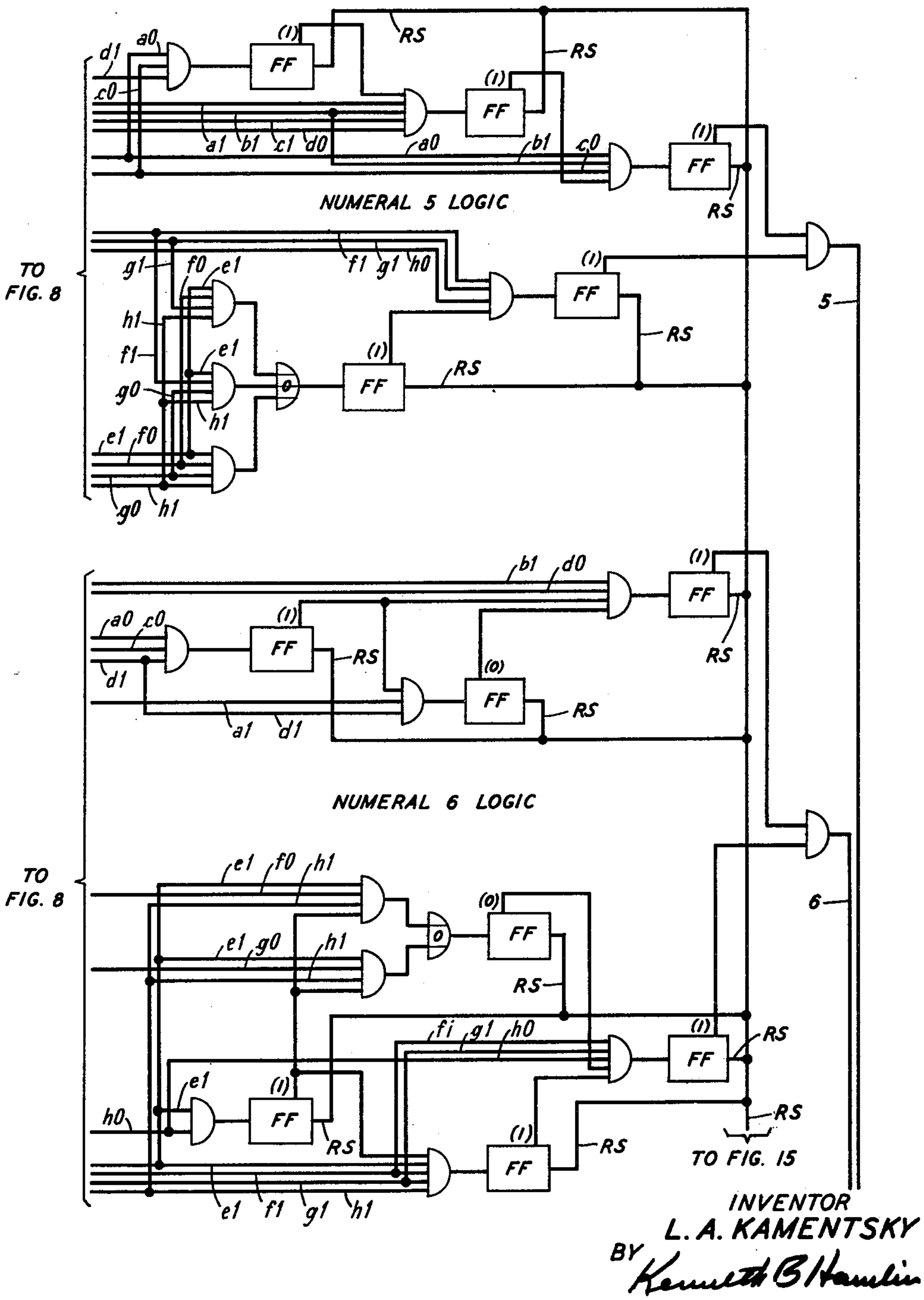
Figure 15:
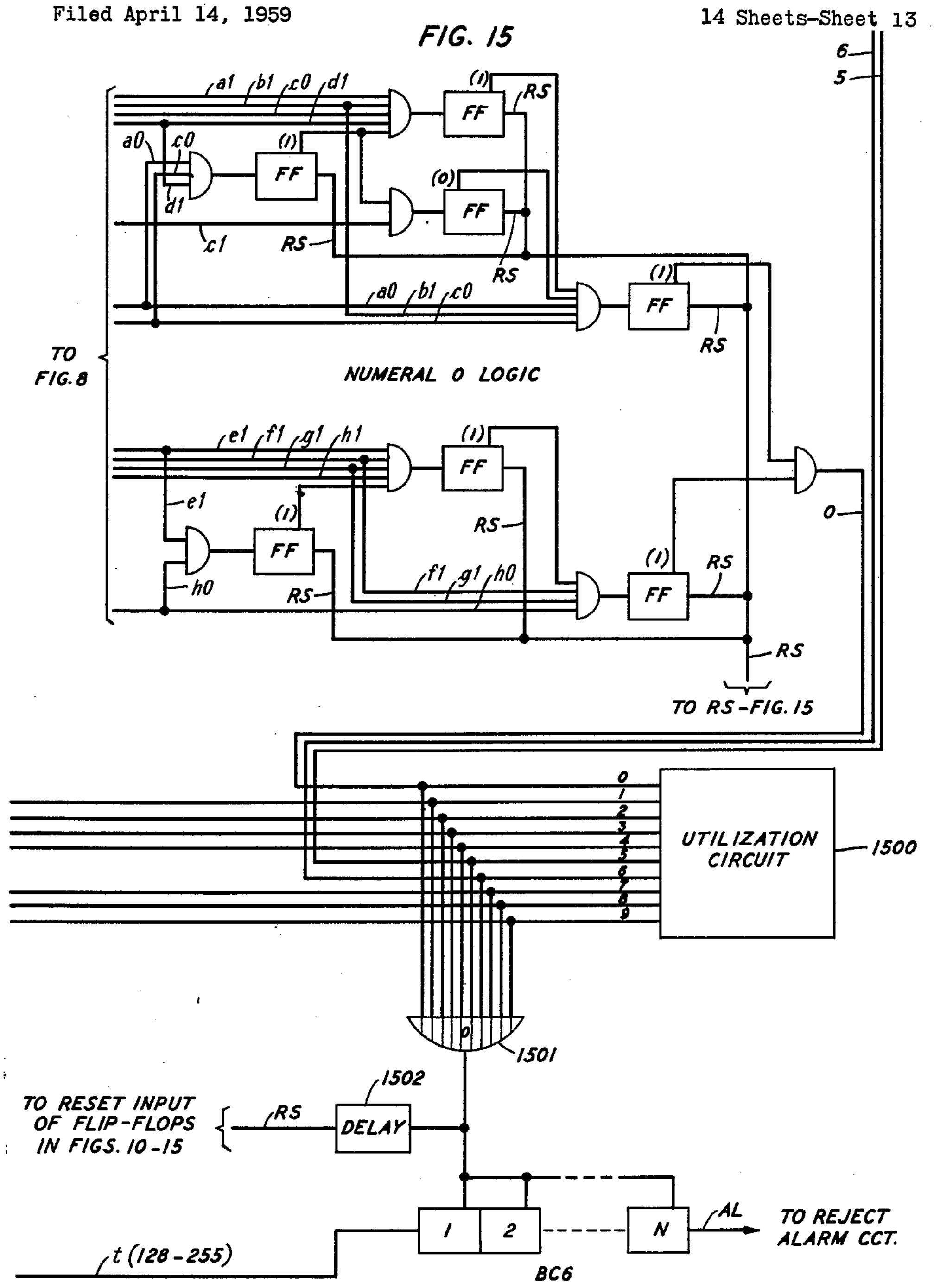
Figure 17A:
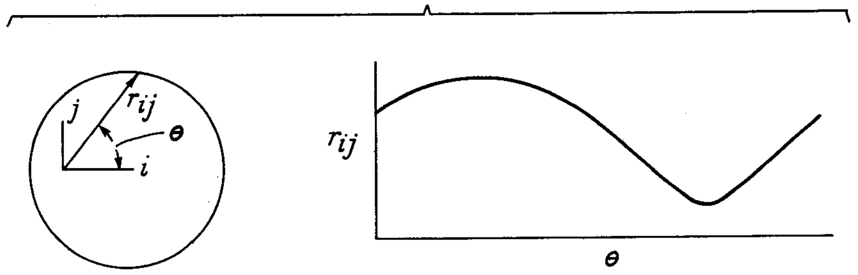
Figure 17B:
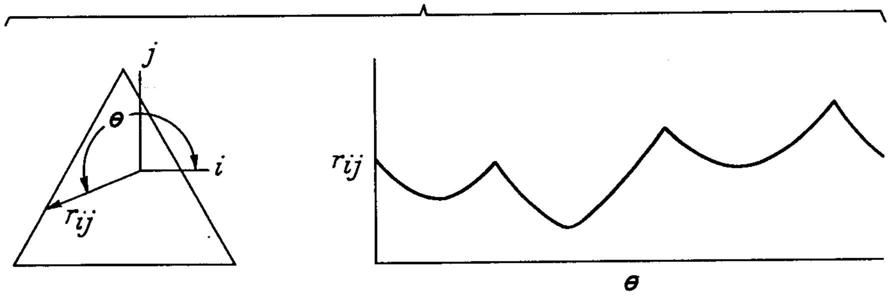
Figure 17C:
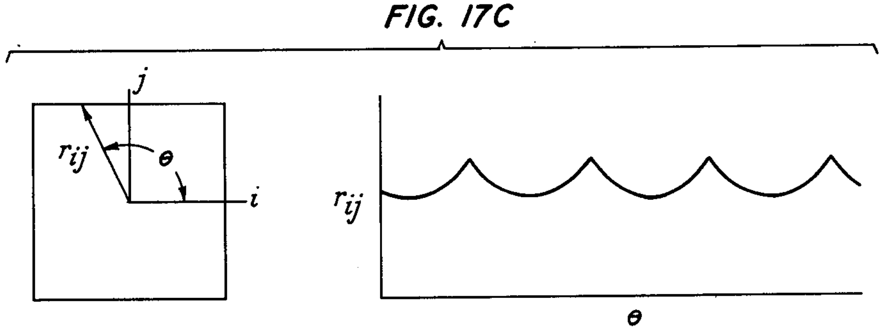
Figure 16:
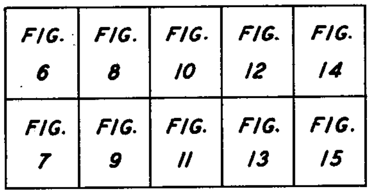

FIGS. 6 through 15, when arranged as shown in FIG. 16, show a detailed block diagram schematic of the illustrative embodiment of the character recognition system of the present invention shown in the general block diagram of FIG. 4A and in which:

FIGS. 6 and 7 show in block diagram form the clock pulse source, and binary counter and timing circuits utilized to synchronize the operation of the system;

FIG. 8 is a block diagram schematic of the scan pickup and integration circuits utilized to detect light reflections from the character field;

FIG. 9 is a block diagram schematic of the flying spot scanner, associated control circuitry therefor, and the automatic scan registering circuits of the present invention;

FIG. 10 is a block diagram schematic of the logic circuitry utilized to recognize the Arabic numerals 1 and 2;

FIG. 11 is a block diagram schematic of the logic circuitry utilized to recognize the Arabic numerals 7 and 8;

FIG. 12 is a block diagram schematic of the logic circuitry utilized to recognize the Arabic numerals 3 and 4;

FIG. 13 is a block diagram schematic of the logic circuitry utilized to recognize the Arabic numeral 9 and the closed loop recognition circuits of the present invention;

FIG. 14 is a block diagram schematic of the logic circuitry utilized to recognize the Arabic numerals 5 and 6;

FIG. 15 is a block diagram schematic of the logic circuitry utilized to recognize the Arabic numeral 0 and the output circuitry of the present invention; and FIGS. 17A, 17B and 17C illustrate in graphical form the basic principle of the closed loop resolution circuit of the present invention.

Figure 1:
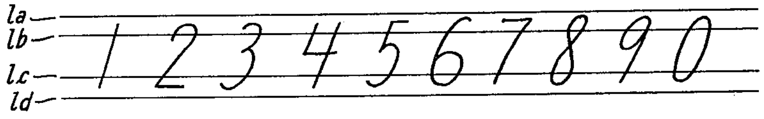
FIG. 1 depicts the manner in accordance with the present invention in which the hand writing or printing of Arabic numerals may be controlled to adapt the numerals for automatic machine reading.

Turning now to the drawing, FIG. 1 shows one illustrative embodiment of the manner, in accordance with the present invention, in which the hand writing of Arabic numerals may advantageously be controlled to adapt the handwritten numerals for automatic machine reading. It is to be understood that, although this method of control is illustrated only with respect to Arabic numerals in FIG. 1, the identical method of control may be utilized in the hand writing of machine-readable alphabetical letters as well. In accordance with the present invention, four parallel lines designated 1*a*, 1*b*, 1*c* and 1*d* in FIG. 1 are utilized as guides for the hand writing of the alpha-numeric characters. The writer is instructed to form the characters with reference to these four lines so that the loops of the characters intersect the two central lines 1*b* and 1*c*. The space between lines 1*a* and 1*b* and the space between lines 1*c* and 1*d* as shown in FIG. 1 serve as limiting areas, respectively, for the upper and lower portions of the characters. Thus lines 1*a* through 1*d* serve as guides and not restrictions in the writing of alpha-numeric characters.

Figure 2:
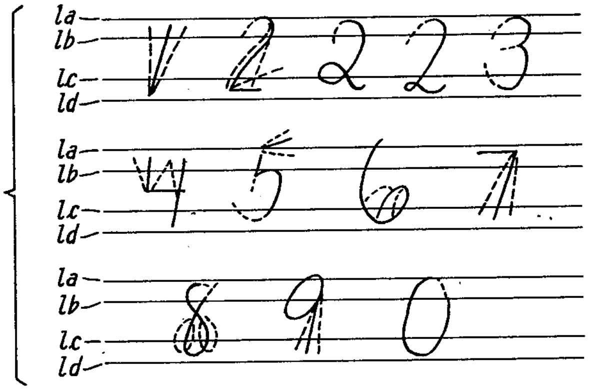
FIG. 2 illustrates a few of the permissible variations of handwritten Arabic numerals which can be machine read in accordance with the present invention.

The method of controlling the hand writing of alpha-numeric characters, in accordance with the present invention, permits many variations in the formation of the characters. FIG. 2 illustrates but a few of the possible variations permissible in the hand writing of Arabic numerals. The possible variations in over-all height of the characters have not been indicated but may vary within the range of the spacing of the four guide lines. Similar variations are permissible in the writing of alphabetical letters.

Although the discussion above has been directed to a method of control of the hand writing of alpha-numeric characters, it is to be understood that the same method may be used to guide the machine printing of alpha-numeric characters. Thus, as long as the alpha-numeric characters are machine printed on the four guide lines so that the characters intersect the two central guide lines, the machine printed characters are adapted for automatic machine reading.

Figure 3:
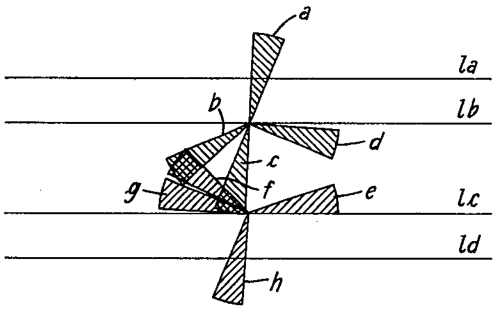
FIG. 3 is a pictorial representation of the radial criterion areas comprising the bipolar scan pattern utilized to recognize alpha-numeric characters.

The basic scanning principle advantageously utilized in accordance with the present invention to recognize the machine printed or handwritten alpha-numeric characters when printed or handwritten on the four guide lines in the manner described above is similar to that disclosed in the above-cited copending application of T. L. Dimond. The identity of the particular characters is determined by noting the traversals of particular criterion areas in the character field and by determining the number of corners in closed loops of the characters, as will be described. The basic scan pattern is shown in FIG. 3 where eight radial criterion scan areas designated *a* through *h* are used for character recognition. It is to be understood that the number of radial criterion scan areas used in recognizing the characters in the specific embodiment described herein is illustrative only as a fewer or greater number of areas may advantageously be utilized. It is further understood that the relative location or angular position of the radial criterion scan areas *a* through *h* shown in FIG. 3 and the width of the respective areas are illustrative only and the position and/or width of the respective areas may be varied as required.

In accordance with another aspect of the present invention, the basic scan pattern illustrated in FIG. 3 is generated by a flying spot scanner. As shown in FIG. 4, the light spot from a flying spot scanner designated FSS is focused by means of lens system SL on the paper or form on which appear the alpha-numeric characters to be automatically recognized. This paper or form as shown in FIG. 4 is placed on a carriage CR which is moved from right to left by a mechanism not shown in the drawing into the field of flying spot scanner FSS. The light pattern from flying spot scanner FSS focused on the paper or form is resolved into two beams and directed to two separate positions. One beam is directed through a color filter and lens system designated FLR to a photomultiplier designated PMR, the output of which is fed to logic circuitry which controls the automatic registration of the light spot from flying spot scanner FSS on the two central guide lines used to control the hand writing or printing of the alpha-numeric characters. A second beam is focused through a color filter and lens system designated FLC to a photomultiplier designated PMC, the output of which is fed to logic circuitry which controls the recognition and translation circuits of the present invention.

In the illustrative embodiment of the present invention, the alpha-numeric characters are written or printed in one color of ink and the guide lines with respect to which the characters are printed or written are a different color. The color filter and lens system FLR is arranged so that it will focus on photomultiplier PMR only the light reflections which indicate the crossings of the guide lines by the spot of light from flying spot scanner FSS. The color filter and lens system FLC is arranged to focus on photomultiplier PMC only the light reflections which indicate the crossings of the alpha-numeric characters by the spot of light from flying spot scanner FSS.

As will be described hereinafter, the light spot focused on the form or paper on which the characters appear is controlled to generate a plurality of radial scans emanating, first from a point on guide line 1*b* and, second, from a point on guide line 1*c*. The radial scans are generated by movement of the electron beam in flying spot scanner FSS from the center out some predetermined distance from the center. This scan retraces, blanking out on retracing, and scans out again a certain angular distance away from the previous scan. In other words, the scans appear as a series of radii. In the illustrative embodiment of the present invention described herein, 128 such radial scans are made from guide line 1*b*. After completion of 128 radial scans from guide line 1*b* the electron beam is automatically repositioned so that the light spot is focused on guide line 1*c* and another 128 radial scans are then made. After this, the cycle repeats itself and the light spot is again centered on guide line 1*b* and a new cycle of radial scans is started. The radial scans alternate between guide lines 1*b* and 1*c* with 128 radial scans being alternately made from each of the two guide lines.

As will be described in detail hereinafter, the criterion scan areas *a* through *h* comprising the basic scan pattern shown in FIG. 3 are defined by gating the light reflections obtained during particular ones of the radial scans made from the two scan centers to the logic recognition circuitry. This is accomplished in the present invention by means of a clock pulse source which controls the sweep circuitry of flying spot scanner FSS, the automatic registration circuitry for positioning the light spot, and the circuitry which controls the position of the criterion scan areas.

Figure 5:
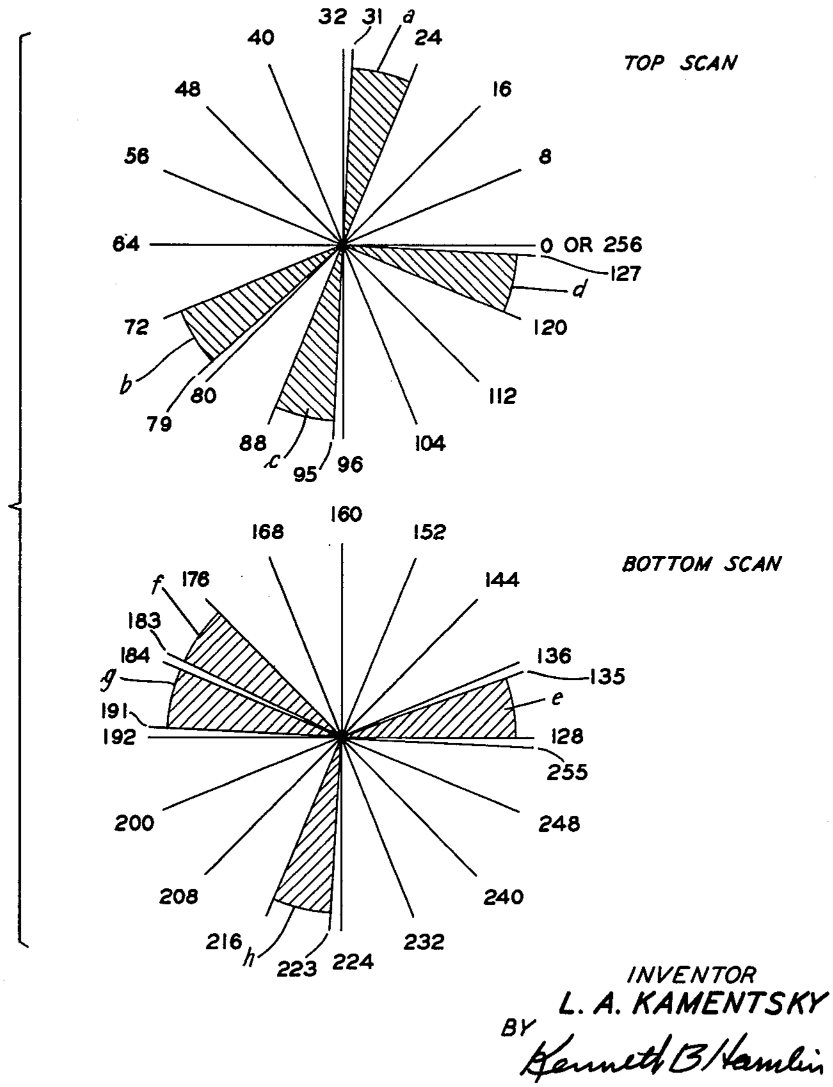
FIG. 5 shows in pictorial form the manner in which the criterion areas of the bipolar scan pattern of FIG. 3 are generated by a plurality of radial scans from two scan centers.

Referring to FIG. 5 of the drawing, the timing of the rotating radial scans of flying spot scanner FSS and the manner in which the scan pattern illustrated in FIG. 3 is defined thereby will be briefly described. Following this description a more detailed description of flying spot scanner FSS and the associated logic circuitry will be given with respect to FIGS. 6 through 15 of the drawing. As indicated hereinbefore, flying spot scanner FSS shown in FIG. 4 and FIG. 4*a* is controlled in the illustrative embodiment of the present invention to make 128 radial scans of the light spot thereof from each of two centers, and the light reflections from selected ones of these radial scans are gated to logic circuitry and thus define radial criterion areas *a* through *h*. The top and bottom rotating radial scans which comprise one scan set or bipolar scan made by the light spot of flying spot scanner FSS are independent, and accordingly a basic clock rate of 128 pulses will control the generation of the 128 radial scans required for each of the top and bottom portions of the bipolar scan pattern. The light reflections obtained from the character field on eight adjacent ones of these radial scans are utilized in the illustrative embodiment of the present invention to define a radial criterion area.

In response to the first clock pulse, flying spot scanner FSS is controlled to sweep the spot of light thereof from the upper center to the far right horizontal position as shown in FIG. 5. This is indicated by scan 1 in FIG. 5. The clock pulse continues pulsing and the flying spot scanner continues its radial scan operation in response thereto, each radial scan being angularly displaced from the preceding scan until the 24th clock pulse is received. When the 24th clock pulse is received, a signal is generated to indicate the start of radial criterion area *a*, this criterion area includes the next eight radial scans 24 through 31 made by flying spot scanner FSS from the upper center. Thus the light reflections received from the character field during radial scans 24 through 31 of flying spot scanner FSS from the upper center as shown in FIG. 5 are gated to logic circuitry and define radial criterion area *a* shown in FIG. 3.

Clock pulses 32 through 71 in turn control the scanning of the light spot of flying spot scanner FSS as shown in FIG. 5 to make radial scans 32 through 71. However, during scans 32 through 71 the light reflections from the character field are not gated to logic circuitry. When clock pulse 72 is received and controls the generation of radial scan 72, a signal is generated indicating the start of radial criterion area *b*. The light reflections from the character field received during the next eight radial scans, that is, scans 72 through 79, are gated to the logic circuitry and radial criterion area *b* is thus defined.

On the 80th through the 87th scans, as shown in FIG. 5, the logic circuitry remains inactive. However, during the succeeding eight radial scans, that is, scans 88 through 95, the light reflections from the character field are gated to the logic circuitry and thus radial criterion area *c* is defined.

In response to clock pulses 96 through 119, the flying spot scanner generates radial scans 96 through 119. During these scans the logic circuitry remains inactive and no light reflections from the character field are gated to the logic circuitry.

In response to the 120th clock pulse, a signal is generated indicating the start of radial criterion area *d*, and the light reflections from the character field for the next eight radial scans, that is, scans 120 through 127, are gated to the logic circuitry and thus radial criterion area *d* is defined.

When the 128th clock pulse is received, the flying spot scanner in response thereto repositions its scanning center and scans from the lower center as shown in FIG. 5. Thus, in response to the 128th clock pulse, the light spot from flying spot scanner FSS extends to the far right horizontal position from the lower center as shown in FIG. 5. This is indicated by scan number 128 in FIG. 5. When clock pulses 128 through 135 are received, the radial scans 128 through 135 of the light spot from flying spot scanner FSS are used to define radial criterion area *e* and the light reflections received from the character field during these scans are gated to the logic circuitry. The cycle count for the second complete series of 128 scans from the lower center is as indicated in FIG. 5. The logic circuitry remains inactive during radial scans 136 through 175. In response to clock pulses 176 through 183 which control radial scans 176 through 183, the logic circuitry is gated to admit the light reflections from the character field to the logic circuitry and thus radial criterion area *f* is defined.

Similarly, in response to clock pulses 184 through 191, which control scans 184 through 191, the logic circuitry is gated to receive the light reflections from the character field and radial criterion area *g* is defined. Thereafter the logic circuitry remains closed for radial scans 192 through 215. When clock pulses 216 through 223 are received, which control the generation of radial scans 216 through 223, the light reflections from these radial scans are gated to logic circuitry and radial criterion area *h* is defined.

Flying spot scanner FSS continues the radial scanning pattern from the lower center until the 255th clock pulse is received. Upon receipt of the 256th clock pulse, flying spot scanner FSS is controlled to reposition the radial scanning from the lower center to the upper center and the above-described scanning cycle is completed.

A description of the manner in which the electron beam in flying spot scanner FSS shown in FIG. 4 is deflected from the top to the bottom scan cycle and vice versa, and the manner in which the deflection circuitry in the flying spot scanner is controlled to generate the 128 rotating radial scans of the light spot thereof from each of the two centers, will be described in detail hereinafter.

As shown in FIG. 4, the light spot of flying spot scanner FSS is focused on the character field with the direction of the feed of carriage CR from right to left. Thus, flying spot scanner FSS sees each character in the character field from the left as carriage CR moves the paper on which the characters appear and each character passes underneath the scanner pattern and exits from the scanner pattern to the left. The ratio of the feed speed to the clock pulse speed may advantageously be adjusted to provide a character reading rate which is compatible with the data processing or utilization circuits which may advantageously be controlled by the present invention. As the field of a character moves under the scanning pattern a plurality of sets of bipolar scans will be made of each character (a set of bipolar scans consisting of two scans, the upper and lower rotating radial scans). The clock pulse speed and the carriage feed speed for accurate character recognition, in accordance with the present invention, are factors which will vary with the size of the characters to be recognized, the type font of the characters to be recognized, and the degree of accuracy required.

The cooperative relationship of the various circuits and components comprising the illustrative embodiment of the invention is shown in block diagram form in FIG. 4A. The figures shown in parentheses in the various blocks indicate the figures of the drawing in which a more detailed block diagram schematic of the component is given. The reference designations utilized in FIG. 4A correspond to the designations utilized in the remaining figures of the drawing.

DETAILED DESCRIPTION

Turning now to the drawing, a more detailed description of the illustrative embodiment of the flying spot scanner, associated automatic registering circuits and associated recognition logic of the present invention will be given with respect to FIGS. 6 through 15 of the drawing when arranged as shown in FIG. 16. The operation of the synchronizing system in the illustrative embodiment of the present invention will be described first. This will be followed in turn by a description of the flying spot scanner deflection control circuitry, a description of the scan pickup and integration circuitry utilized to recognize intersections of line segments in the character field, a description of the recognition logic circuitry for translating the outputs of the integration circuitry, and, last, a description of the automatic registering circuitry whereby the bipolar radial scan of the flying spot scanner is automatically registered on the four parallel guide lines used in the illustrative embodiment of the present invention to guide the hand writing or machine printing of alphanumeric characters.

SYNCHRONIZING SYSTEM

As indicated hereinbefore, the sweep circuitry of flying spot scanner FSS, the automatic registering circuitry for positioning the bipolar scan pattern of flying spot scanner FSS on the parallel guide lines, and the logic circuitry which controls the angular position of the radial criterion areas, are synchronized by a clock pulse source. The synchronizing system is shown in schematic form in FIGS. 6 and 7 and comprises clock pulse source 600, binary counter BC1, and the translating network connecting the outputs of the respective stages of binary counter BC1 to AND gates 601 through 608 and 701 through 704.

Clock pulse source 600 supplies a continuous train of clock pulses at a desired frequency and may advantageously be any type of clock pulse source known in the art. The clock pulses from the output of clock pulse source 600 are supplied to lead CP which extends to delay circuit 800 shown in FIG. 8, the purpose of which will be described hereinafter, to sawtooth generator 900 shown in FIG. 9 to synchronize the radial sweeps of flying spot scanner FSS, as will be described hereinafter, and to binary counter BC1 shown in FIG. 6.

Binary counter BC1 may advantageously be any type of the binary counters known in the art and, as shown, comprises eight binary stages. Each of these eight stages is designated with a designation in parentheses indicating the decimal equivalent of the binary stage. Each of the eight stages of binary counter BC1 is arranged in the manner known in the art to supply "two rail logic output signals." In other words, each stage of binary counter BC1 and a (0) and a (1) output lead. These leads extend to and from the translating network shown in FIGS. 6 and 7. Because binary counter BC1 comprises eight binary stages, the counter is capable of counting from 0 to 255 and, accordingly, as clock pulses from clock pulse source 600 are applied to the input of binary counter BC1, the counter will count, in the binary fashion well known in the art, the successive pulses applied thereto. For example, when the first clock pulse is applied to stage (1) of binary counter BC1, this stage will be set to its "1" state and will apply a signal over its (1) output lead. When the second clock pulse from clock pulse source 600 is applied to binary counter BC1, stage (1) will be set to its "0" state and stage (2) will be set to its "1" state in typical binary fashion. As succeeding pulses from clock pulse source 600 are applied to binary counter BC1, the respective stages will operate in the manner well known in the art.

The two rail logic (0) and (1) output leads from the respective stages of binary counter BC1 are connected in a translation circuit, in the manner shown in FIGS. 6 and 7, to AND gates 601 through 608 and 701 through 704. The output of each of these AND gates supplies a timing signal which is utilized by the flying spot scanner deflection circuitry, the integration circuitry and output circuitry, in the manner to be described hereinafter. For example, the inputs of AND gate 601 shown in FIG. 6 are connected respectively to the (0) output lead of stage (128), the (0) output lead of stage (64), the (0) output lead of stage (32), the (1) output lead of stage (16), and the (1) output lead of stage (8) of binary counter BC1. Thus, when the respective stages in binary counter BC1 are operated such that stage (8) is in its "1" state, stage (16) is in its "1" state, and stages (32), (64) and (128) are in the "0" state, AND gate 601 will be actuated to apply a signal to the output lead $t$(24—31) therefrom. The above-recited conditions for stages (8), (16), (32), (64), and (128) of binary counter BC1 will be maintained between the 24th and 31st clock pulses from clock pulse source 600 applied to binary counter BC1 and, accordingly, a signal will be applied to lead $t$(24—31) during the interval of these clock pulses. The remaining AND gates 602 through 608 and 701 through 704 are connected to the respective (0) and (1) output leads of the various stages of binary counter BC1 in a similar fashion so as to provide signals of desired duration on their respective output leads. These output leads carry designations indicating the duration of the signal applied thereto. For example, output lead $t$(72—79) from AND gate 602 will have a signal applied thereto during the interval of clock pulses 72 through 79. Similarly, AND gate 608, for example, applies a signal to lead $t$(216—223) during the interval of the 216th through the 223rd clock pulses from clock pulse source 600. AND gate 701 will apply a signal to lead $t$(24) only when the 24th clock pulse from clock pulse source 600 is applied to binary counter BC1. In a similar fashion AND gate 702 will apply a signal to its output lead $t$(216) only when the 216th clock pulse from clock pulse source 600 is applied to binary counter BC1. AND gate 609 has inputs connected to the (1) output leads of stages (1), (2) and (4) of binary counter BC1 and will be actuated every 7th clock pulse from clock pulse source 600 to apply a signal pulse to lead $t$(RS3).

Referring to FIG. 6, it will be noted that lead $t$(RS) is connected directly to the (1) output lead of stage (8) of binary counter BC1. This lead will have a signal applied thereto during the interval that stage (8) of binary counter BC1 is in its "1" state. Thus when the 8th clock pulse from clock pulse source 600 is applied to binary counter BC1 stage (8) is set to its "1" state and a signal is applied to lead $t$(RS). This signal is maintained on lead $t$(RS) during the interval between the 8th through 15th clock pulses at which time stage (8) is set to its "0" state. Similarly, a signal is applied to lead $t$(RS) during the intervals between clock pulses 24 through 31, 41 through 47, 56 through 63, et cetera. The purpose of the signals applied to lead $t$(RS) will be described hereafter with reference to the integration circuits of FIG. 8. Similarly, lead $t$(128—255) is connected directly to the (1) output of stage (128) of binary counter BC1, and this lead will have a signal applied thereto during the 128th through the 255th clock pulses applied to binary counter BC1, that is, during the interval that stage (128) of binary counter BC1 is in the "1" state. In the foregoing manner, the various gating signals required to define the radial criterion areas $a$ through $h$ discussed above with respect to FIG. 5, the control signals required to synchronize the radial scan operation of flying spot scanner FSS, and the control signals utilized to control the automatic registration of the bipolar scan pattern generated by flying spot scanner FSS on the parallel guide lines, are produced.

FLYING SPOT SCANNER AND RADIAL SCAN CONTROL CIRCUITS

As indicated hereinbefore, flying spot scanner FSS is controlled to scan in a bipolar rotating radial scan pattern. The manner in which this is accomplished will now be described with respect to FIG. 9. FIG. 9 shows a simplified block diagram schematic of flying spot scanner FSS and its associated radial scan circuitry. The upper portion of FIG. 9 shows in schematic form the automatic registration circuits which control the automatic registering of the bipolar scan pattern on the parallel guide lines used in the illustrative embodiment of the present invention to guide the hand writing or machine printing of alpha-numeric characters. The automatic registering circuits will be described hereinafter.

The control of cathode ray tubes to sweep in a rotating radial pattern is well known in the art and has been used particularly in radar installations for PPI (plan position indication) radar scopes. There are a number of ways known in the art to generate a rotating radial scan in a cathode ray tube. One is to produce on a pair of horizontal and vertical deflection coils of a cathode ray tube a set of voltages, the voltage on one of the deflection coils being a sawtooth wave modulated by a sine wave and the voltage on the other set of coils being a sawtooth wave modulated by a sine wave wherein the sine wave is 90 degrees out of phase with the first sine wave voltage. The application of the two sine waves 90 degrees out of phase will produce a circular Lessejea figure on the face of the cathode ray tube. This circular figure is made to vary in radial distance from the center of the cathode ray tube face to the outer edge at a specified rate by the sawtooth component of the voltages applied to the respective deflection coils. The magnitude of the sawtooth component is adjusted in amplitude so that the proper scanning distance from the center to the outer edge of the face of the cathode ray tube is obtained.

In the illustrative embodiment of the present invention as shown in FIG. 9, the cathode ray tube of flying spot scanner FSS is controlled in the above-described manner to produce a rotating radial scan about two centers on the face of the cathode ray tube. Sawtooth generator 900 shown in FIG. 9 is triggered in response to each clock pulse received over lead CP from clock pulse source 600 shown in FIG. 6 to generate a sawtooth voltage. This sawtooth voltage is applied to modulator 903. The other input of modulator 903 is obtained from the output of sine wave generator 901. Sine wave generator 901 is triggered so that one complete cycle of 360 degrees of the sine wave is produced for each of the top and bottom radial scans of 128 pulses. In the illustrative embodiment of the present invention, this is accomplished by differentiating the signal applied to lead $t$(128—255) in differentiator 902. Thus, when clock pulse source 600 has applied 128 pulses to binary counter BC1, as shown in FIG. 6, stage (128) of this counter will be in its "1" state and a signal will be applied to the (1) output lead. This signal will be maintained on the (1) output lead for the next 128 pulses or until the count reaches 255. The signal applied to the (1) output lead of stage (128) is also applied to lead $t$(128—255) and is differentiated in differentiator 902. The output of differentiator 902 applies a sharp pulse to sine wave generator 901 to synchronize it at the correct frequency of oscillation. When the signal on the (1) output lead of stage (128) of binary counter BC1 is removed, the trailing edge of this signal is also differentiated in differentiator 902 and a trigger pulse is applied to sine wave generator 901. The frequency of generator 901 is such that one complete cycle of 360 degrees of a sine wave signal is generated between trigger pulses received over lead $t$(128—255). The sinusoidal signal from sine wave generator 901 is applied to modulator 903, and the output of modulator 903 accordingly is a sawtooth voltage modulated by a sine wave voltage. This is applied over lead 906 to one deflection coil of the radial sweep coils 907 on flying spot scanner FSS. The modulated signal from the output of modulator 903 is applied to 90 degree phase shifter 904, and the output on lead 908 is applied to the other deflection coil of radial sweep coils 907. Thus the electron beam in flying spot scanner FSS is controlled to make a succession of rotating radial scans from a given center. A blanking signal is also obtained from sawtooth generator 900 and is applied over lead 909 to the cathode ray tube of flying spot scanner FSS, in the manner known in the art, to blank the return sweep of each radial scan. The cycle is as follows: In response to each clock pulse received from clock pulse source 600 over lead CP, sawtooth generator 900 generates a sawtooth voltage which generates a radial scan. The return of the sweep to the ground level produces a blanking pulse which is applied to flying spot scanner FSS. Thus, by synchronizing the generation of the sawtooth voltages from sawtooth generator 900, and by synchronizing the generation of the sine wave in sine wave generator 901 with clock pulse source 600, the rotating radial scans thereby produced are synchronized and controlled by the respective clock pulses from clock pulse source 600.

In the illustrative embodiment of the present invention, the circuitry involved in shifting the center of the rotating radial scans between the alternate scan centers is accomplished by gate 905 and resistance RB. Voltage source V1 is connected through resistance RB and gate 905 in parallel to vertical shift deflection coil 910. The value of the current in coil 910 is changed between two levels; in other words, the resistance is gated in or gated out from a series connection between voltage V1 and vertical shift deflection coil 910. Gate 905 is controlled by the signal applied to lead $t$(128—255). During the time that there is a signal applied to this lead, gate 905 will be closed to provide a short circuit around resistance RB. During the time that there is no signal applied to lead $t$(128—255), gate 905 will be open and the current from voltage source V1 to vertical shift deflection coil 910 is supplied through resistance RB; thus the current in the vertical shift deflection coil 910 has either one of two values. During the time that stage (128) of binary counter BC1 shown in FIG. 6 is set to its "1" state, the scan will be centered on the lower of the central guide lines, and during the time that stage (128) of binary counter BC1 is in its "0" state the scan will be centered on the upper of the central guide lines. The gating relationship, that is, whether resistance RB is gated in or gated out when a signal is applied to lead $t$(128—255), depends upon the orientation of the deflection coil and whether voltage V1 is positive or negative.

Because the printing of the parallel guide lines which are utilized to guide the hand writing or machine printing of alpha-numeric characters, in accordance with the present invention, is fairly accurate, the spacing between the guide lines will be constant to the degree necessary for proper character recognition. Accordingly, resistance RB can be adjusted to one specific value and set at this value. However, to vary the distance between the centers of the bipolar radial scan pattern requires only the adjustment of the value of resistance RB, and this can advantageously be accomplished to meet any required spacing between the two central guide lines.

SCAN PICK-UP AND INTEGRATION CIRCUITS

As described hereinbefore, flying spot scanner FSS is controlled to make 128 radial scans from each of two scan centers, and the light reflections from particular ones of these scans are gated to the logic circuitry to define criterion areas in the bipolar radial scan pattern. The manner in which the light reflections from flying spot scanner FSS are picked up, and the manner in which these reflections are integrated and gated, will now be described with reference to FIG. 8 of the drawing. As described hereinbefore, the light reflections from the character field are focused in two beams and directed to two separate positions (see FIG. 4). One beam is directed through color filter and lens system FLC shown in FIG. 4 to photomultiplier designated PMC. Photomultiplier PMC is also shown in FIG. 8 in block diagram form. Photomultiplier PMC sees a continuous light reflection as a radial scan starts from the center and moves toward the edge. If this scan is intersected by a line or a spurious mark, the light intensity reflected to photomultiplier PMC will be reduced as the line or spurious mark is intersected. The output of photomultiplier PMC shown in FIG. 8 is then a voltage which has a specific direct-current level until a mark is encountered. As the scan passes over the mark, the output of photomultiplier PMC will then be a pulse with a negative direction. The duration of this pulse will correspond to the width of the line or mark intersected. Accordingly, for each scan there is a specific pattern of voltage on the output of photomultiplier PMC. If a scan does not intersect a mark, there will be a constant direct-current level. However, when a scan intersects a line or a mark, there will be a negative pulse from the output of photomultiplier PMC for this scan. The output of photomultiplier PMC is applied to amplifier 803, which may advantageously be any type of amplifier known in the art, to amplify the voltage pulse received from the output of photomultiplier PMC. The output of amplifier 803 is applied to threshold circuit 804 which determines whether there is indeed a negative pulse. In other words, threshold circuit 804 will distinguish, at some predetermined threshold, weak pulses caused by reflections from dirt specks or smudges from strong pulses indicating the intersection of a true line or mark. Threshold circuit 804 also advantageously contains pulse shaping circuits known in the art which will shape the poorly defined pulses obtained from the output of amplifier 803 into sharply defined pulses.

As shown in FIG. 8, the output of threshold circuit 804 is applied to the input of flip-flop 805. This flip-flop acts as a one bit storage stage. If there is a pulse from the output of threshold ciricut 804 indicating the intersection of a mark on any particular scan, flip-flop 805 will be set to its "1" state. At the end of the particular scan, flip-flop 805 will be reset by a signal applied from delay circuit 800 over lead 828. It will be noted, referring to FIG. 8, that the input of delay circuit 800 is connected to the CP lead, and accordingly each time a clock pulse is applied to the CP lead from clock pulse source 600 this pulse will be delayed in delay circuit 800 for a duration sufficient for flip-flop 805 to be set to its "1" state if a mark was intersected, and if flip-flop 805 is set, it is reset to its "0" state by the same pulse delayed in delay circuit 800. If there is no pulse at the output of threshold circuit 804, indicating that a line or mark was not intersected in a particular scan, flip-flop 805 remains in its "0" state. At the end of the particular scan the clock pulse which originated this scan and which was delayed in delay circuit 800 will set flip-flop 805 to its "0" state. However, in this case flip-flop 805 is already in its "0" state and accordingly no further action takes place. If a line or mark is encountered on a particular scan, the pulse from the output of threshold circuit 804 will cause flip-flop circuit 805 to be set to its "1" state, and when reset by the delayed clock pulse through delay circuit 800 a signal pulse will be applied from the (1) output of flip-flop 805 to the input of binary counter BC2 shown in FIG. 8. The purpose of the flip-flop 805 acting in the capacity of a one bit storage element is to eliminate the possibility that more than one pulse will be applied to the input of binary counter BC2 in the event that more than one mark or line is intersected on any particular scan.

Binary counter BC2, as shown in FIG. 8, comprises four binary stages. The two rail (0) and (1) output leads from each of the respective stages of binary counter BC2 are connected in a translating circuit to AND gates 806, 807 and 808. The outputs of these AND gates are in turn connected to OR gate 809. The translation circuit including AND gates 806, 807 and 808, and the (0) and (1) output leads of binary counter BC2 are arranged as shown in FIG. 8 such that an output from OR gate 809 will be obtained if six, seven or eight of the radial scans comprising a particular criterion area intersect a mark or a line. In other words, if a spurious mark or dirt on the paper is encountered which only is intersected by one, two, three, four, or five of the adjacent radial scans in any particular criterion area such as criterion area *a*, for example, there will be no output from OR gate 809. However, if a true mark is intersected, six, seven, or eight intersections of the mark by the radial scans comprising the particular criterion area will cause a signal to be applied from the output of OR gate 809 indicating the intersection of a mark in the particular criterion area. It is to be understood that the logical criterion of six, seven or eight intersections is purely arbitrary and may advantageously be changed to meet any particular requirement or any particular width of criterion area that may be utilized.

Binary counter BC2, being a four-stage counter, can count up a total of sixteen pulses. However, at any time during which the counter has counted six, seven, or eight, the output signals on the two-rail logic output leads (0) and (1) from the respective stages of the counter will cause the operation of AND gates 806, 807 and 808, respectively, which in turn will cause the actuation of OR gate 809. The actuation of OR gate 809 applies a signal to lead MP which extends to a group of AND gates which are actuated to define the criterion areas *a* through *h* of the rotating bipolar radial scan pattern as will be described. It is also noted that when OR gate 809 is not actuated the absence of a signal therefrom applied through inverter 810 will cause a signal to be applied to the NMP lead extending to AND gate 830, the purpose of which will also be described later.

Counter BC2 is reset at the end of each radial criterion area by a signal applied to lead RS2. As indicated hereinbefore, a signal is applied to lead $t$(RS) during the intervals that stage (8) of binary counter BC1 is in its "1" state. Thus a substantially square wave signal voltage is applied to lead $t$(RS) with the respective positive and negative portions thereof being equal to the interval of eight clock pulses from clock pulse source 600. This signal is applied over lead $t$(RS) to differentiator 802 to provide sharply defined pulses substantially coincident with the leading and trailing edges of the square wave signal voltage applied thereto. These sharply defined pulses are then applied to lead RS2 and are then utilized to reset the respective stages of binary counter BC2. For example, when the 24th clock pulse from clock pulse source 600 is applied to binary counter BC1, stage (8) of counter BC1 will be set to its "1" state and a sharp rise in signal will be applied to lead $t$(RS). This signal is differentiated in differentiator 802 and a sharply defined pulse is applied over lead RS2 to reset all the stages of binary counter BC2. As indicated hereinbefore, the 24th clock pulse also causes the generation of the 24th radial scan from the upper center of the bipolar scan pattern and, as shown in FIG. 5, this is the first scan of criterion area $a$. Any lines which are traversed on the 24th scan are picked up as described above by photomultiplier PMC and a signal is applied to amplifier 803 through threshold circuit 804 to set flip-flop 805. The same 24th clock pulse when applied through delay circuit 800 will reset flip-flop 805 and will cause a signal to be applied to binary counter BC2 setting this counter to read the count of 1. Similarly, on each of the succeeding scans which define criterion area $a$, that is, scans 25 through 31, the traversal of any marks intersected by these scans will cause the setting of flip-flop 805 which is in turn reset by the delayed clock pulses to apply a pulse to binary counter BC2. In this manner a count of the number of intersections of marks or lines in criterion area $a$ is made in binary counter BC2. When the 32nd clock pulse is applied to lead CP, stage (8) of binary counter BC1 will be set in its "0" state, and accordingly a negative going voltage signal will be applied to the $t$(RS) lead. This signal is differentiated and is utilized to reset the respective stages of binary counter BC2 as described hereinbefore. Thus, during the eight radial scans defining each of the criterion areas $a$ through $h$, binary counter BC2 accumulates a count of the number of marks or lines intersected and, at the end of the 8th radial scan in each of the criterion areas, binary counter BC2 is reset in preparation for the next criterion area. If the count accumulated in binary counter BC2 is 6, for example, during the radial scans comprising criterion area $a$, the (2) and (4) stages of binary counter BC2 will be set in their "1" state. This will cause signals to be applied to the respective (1) output leads of these two stages which are combined with signals on the (0) output leads from stages (1) and (8) in AND gate 806 to cause the actuation of AND gate 806. The actuation of AND gate 806 as described before causes the actuation of OR gate 809 and the application of a signal to the MP lead. In the event that six, seven, or eight intersections of a line or mark are not made during the eight radial scans comprising a particular criterion area, for example, criterion area $a$, a signal will not be applied to the MP lead and instead a signal will be applied to the NMP lead. Thus binary counter BC2 and the translation circuit including AND gates 806, 807 and 808 with OR gate 809, provide an integration of the intersections of marks in each criterion area of the bipolar radial scan pattern to apply an output signal to lead MP only if the predetermined numbers of scan intersections are detected. In this manner dirt and spurious marks are distinguished from true line segments of characters.

As indicated hereinbefore, the criterion areas $a$ through $h$ comprising the basic bipolar radial scan pattern shown in FIGS. 3 and 5 are defined by gating the light reflections obtained during particular ones of the radial scans made from the two scan centers of the bipolar pattern to the recognition logic circuitry. This is accomplished by the even numbered AND gates 812 through 826 shown in FIG. 8. These even numbered AND gates are enabled by a respective one of the output leads of AND gates 601 through 608 shown in FIG. 6 which, as described hereinbefore, have signals applied thereto during the intervals of specific clock pulses. For example, the output lead $t$(24—31) from AND gate 601 has a signal applied thereto during the interval of clock pulses 24 through 31. The signal on this lead, as shown in FIG. 8, is applied to an input of AND gate 812 thus enabling this AND gate during this interval. As described hereinbefore, clock pulses 24 through 31 control the generation of radial scans 24 through 31 from the upper center of the bipolar scan pattern and, as shown in FIG. 5, radial scans 24 through 31 define criterion area $a$ in the scan pattern. Thus the light reflections received from the integration circuitry described hereinbefore on lead MP from the output of OR gate 809 are gated through AND gate 812 by the signal on lead $t$(24—31) to the input of binary counter BC3$a$. In this manner criterion area $a$ is defined. The remaining criterion areas $b$ through $h$ are defined in a similar manner. For example, output lead $t$(216—223) from AND gate 608 is applied to an input of AND gate 826. Thus during clock pulses 216 through 223 which control the generation of radial scans 216 through 223 from the lower center of the bipolar scan pattern which comprises criterion area $h$, the detected light reflections appearing on output lead MP from OR gate 809 are gated through AND gate 826 to the input of binary counter BC3$h$. A similar gating action takes place for each of the specific criterion areas of the bipolar radial scan pattern.

In accordance with an aspect of the present invention, the light reflections detected from line segments of characters which lie longitudinally with respect to the radial scan pattern are not utilized by the recognition logic circuitry, thus enabling the recognition logic circuitry to be considerably simplified. This is accomplished by the three-stage binary counters BC3$a$ through BC3$h$ shown in FIG. 8. As the field of a particular character moves under the scanner the individual character will be scanned a plurality of times by the rotating bipolar scan pattern. The number of bipolar radial scans made of each character will depend upon the clock pulse rate from clock pulse source 600 and the speed of the movement of carriage CR (shown in FIG. 4) which moves the character through the scan pattern. The clock pulse rate and the speed of movement of carriage CR may advantageously be adjusted so that each character will be scanned twenty times, for example, by the bipolar scan pattern.

It will be observed that the criterion areas of the bipolar radial scan pattern will detect light reflections from line segments of the character on each of the bipolar radial scans, that is, on each scan cycle. It will further be observed, referring to the scan patterns shown in FIGS. 3 and 5, that line segments which are generally parallel or extend longitudinally with respect to the criterion areas will pass through the criterion areas more rapidly and accordingly will not be detected as many times during the plurality of scans as those line segments of the characters which are transverse to the criterion areas of the scan pattern. For example, if the Arabic numeral 1 is being moved into the scan pattern from right to left, intersections of line segments of the numeral 1 with first be noted in criterion areas $d$ and $c$, and because these segments are transverse with respect to criterion areas $d$ and $e$ they will be detected in these criterion areas on many of the bipolar radial scans. It will be noted that, as the Arabic numeral 1 moves on through the scan pattern, line segments of the numeral 1 will also be detected in criterion areas $a$, $c$ and $h$. Because these segments extend longitudinally with respect to criterion areas $a$, $c$ and $h$ or more or less in a parallel direction therewith, fewer intersections of these line segments will be detected by the successive bipolar scan patterns.

In order to simplify the recognition logic circuitry, only the intersections of line segments of the characters which are in a general transverse direction with respect to the criterion areas are utilized. Accordingly, the intersections of the line segment of the Arabic numeral 1 in criterion areas *a, c* and *h* are not transmitted to the recognition logic circuitry. The manner in which this is accomplished will be seen from FIG. 8 wherein each criterion area is assigned an individual three-stage binary counter such as counter BC3*a* for criterion area *a*. Each of these counters counts up to 8 and a count of 8 is required from these counters before an output indication is given from the respective output leads of these counters. Thus, for example, before a signal is applied to the *a*1 lead from the output of binary counter BC3*a*, there must be eight signals applied to its input. These eight signals represent the detection of marks in criterion area *a* on eight successive bipolar radial scans of a character. It is to be understood that the number eight is not an absolute value and the number required depends upon the width of the scanning beam for each criterion area, upon the feed rate of carriage CR, and upon the pulse rate of clock pulse source 600. Binary counters BC3*a* through BC3*h* may advantageously be arranged for any desired count. It will be observed that as each successive bipolar radial scan of a character is made the signals indicating the detection of a mark in each scan are applied through the respective even numbered AND gates 812 through 826 to the respective counters of the criterion areas. Thus, on each scan, if a mark is detected, and this mark, of course, is the resultant output from the integration circuitry described with respect to binary counter BC2 and AND gates 806, 807 and 808, a count of 1 will be added to the respective criterion area binary counters BC3*a* through BC3*h*. When a count of 8 is reached in any of these counters indicating that on eight successive bipolar radial scans of the character a mark was detected in the particular criterion area, a signal will be applied to the respective one of leads *a*1 through *h*1 which extend to the recognition logic circuitry. However, if during the course of the scanning of any particular character a mark is not detected in a particular criterion area, no signal will be applied to the MP lead from the output of OR gate 809 and, as indicated hereinbefore, a signal will be applied to the NMP lead. The signal on the NMP lead is applied to an input of AND gate 830, the other input of which is connected to the output of delay circuit 831. The input of delay circuit 831 is connected to the *t*(RS3) lead which, as indicated hereinbefore, has a signal applied thereto whenever stages (1), (2) and (4) of binary counter BC1 are set in their "1" state and cause the actuation of AND gate 609. Thus when clock pulse 31 is applied to binary counter BC1 it causes the generation of the 31st radial scan which, as indicated hereinbefore, is the last radial scan of criterion area *a*. If this radial scan or if the preceding radial scans did not encounter marks in the character field as described hereinbefore, binary counter BC2 will not have been set to indicate the intersection of the required number of marks and a signal will be applied from the output of inverter 810 to the NMP lead. The signal present on lead NMP in coincidence with the signal applied to the *t*(RS3) lead through delay circuit 831 will cause the actuation of AND gate 830. Delay circuit 831 advantageously provides a period of delay slightly longer than delay circuit 800 described hereinbefore to permit the output of translation circuits comprising AND gates 806, 807 and OR gate 809 to be gated through AND gate 830 after binary counter BC2 receives the last pulse from flip-flop 805 when flip-flop 805 is reset by the signal pulse applied to lead 828. The signal on the output of AND gate 830 is gated through the odd number AND gates 811 through 825 to the respective binary counters BC3*a* through BC3*h* associated with the particular criterion area being scanned to reset the binary counter associated with the particular criterion area. For example, if marks were detected on four successive bipolar radial scans of a character in criterion area *a*, AND gate 812 will be actuated to pass a signal to binary counter BC3*a* four successive times. On the 5th bipolar radial scan of the character, suppose that a mark is not detected in the criterion area *a*; the signal applied on lead NMP is gated through AND gate 830 and causes the actuation of AND gate 811 which applies a signal to the RS*a* lead to effect the resetting of binary counter BC3*a*. At any time when one of the counters BC3*a* through BC3*h* has not counted a total of eight input signals, no output signal will be applied to the respective *a*1 through *h*1 leads, and instead a signal is applied to the respective *a*0 through *h*0 leads through an inverter such as inverter 827 shown in FIG. 8.

To summarize the operations of the logic circuitry shown in FIG. 8, signals are applied to the respective *a*0, *a*1 through *h*0, *h*1 leads corresponding to detection of marks or no marks in the respective criterion areas. When a specific scan intersects a mark an indication of this is made by the application of a signal to binary counter BC2. If there are six, seven or eight such intersections in a particular criterion area, an output signal will be applied to lead MP from OR gate 809, and if such a signal is applied to lead MP for at least eight successive bipolar radial scans, an output signal will be applied from the binary counter BC3 associated with the particular criterion area being scanned. If at any time a mark is not detected in any particular criterion area, a signal will be applied to the NMP lead instead of the MP lead and the binary counter BC3*a* lead associated with the particular criterion area will be reset. The *a*0, *a*1 through *h*0, *h*1 leads, which are the outputs of the binary counters BC3*a* through BC3*h* in FIG. 8, extend to the recognition logic circuitry shown in FIGS. 10 through 15.

*Recognition Logic Circuitry*

The logic circuitry for recognizing each of the Arabic numerals 1 through 0 is shown in FIGS. 10 through 15 as individual circuits. It is understood that simplification of the total logic circuitry may advantageously be realized by bringing the individual logic circuits together into a single more complex arrangement using less components. However, in the implementation shown in FIGS. 10 through 15, the explanation of the logic required to recognize each of the individual Arabic numerals 1 through 0 is simplified by associating each of the Arabic numerals with individual logic circuitry.

The logic codes required for recognition of each of the Arabic numerals 1 through 0 may advantageously be determined by passing the criterion areas of the bipolar radial scan pattern shown in FIG. 3 over each of the Arabic numerals. As the numerals move from right to left with respect to the criterion areas, changes in the criterion areas intersected will be noted. Thereby a list of criterion areas intersected for each possible position of each numeral as the numerals pass through the bipolar radial scan pattern will be obtained. These lists may then be logically processed to formulate a set of allowable and forbidden codes for each of the Arabic numerals. Such a list of allowable and forbidden codes for each of the numerals is given below in the table designated "Recognition Logic Table."

For purposes of determining the logic code for each of the numerals, the top and bottom scans of the bipolar radial scan pattern shown in FIG. 3 are treated as independent scans and their code tables are independent up to a point which will be described later. Referring to the table, a 0 under a criterion area column indicates that a mark or line was not detected in a particular criterion area, a 1 in a criterion area column indicates that a mark or line was detected, and a dash in a criterion area column indicates a "don't care" condition, that is, it is not important whether a line or mark is intersected. As the characters move through the scan pattern, logic conditions are met in stages or steps in performing the translation.

In the table these logic stages are indicated under the columns "Logic Stage." The XU stages represent the logic stages for the upper scan of the bipolar radial scan pattern, and the XL stages represent the lower stages of the logic required in the bipolar radial scan pattern. The respective stages are bracketed in the table. For example, the logic code for the upper scan of the bipolar radial scan pattern for recognizing the Arabic numeral 1 has a logic stage designated XU1 in the table which is met when the conditions in criterion areas *a*, *b*, *c* and *d* are respectively 0, —, 0 and 1. The logic stages in the table which are bracketed with a primed symbol, as, for example, the XU2 stage for the Arabic numeral 1, are inhibiting stages representing forbidden codes in the logical recognition of the character. The implementation of the recognition logic table for the Arabic numerals 1 through 0 are shown in detail in FIGS. 10 through 15 for the respective numerals. Not all of the specific logical elements shown in FIGS. 10 through 15 will be described in detail as it is believed that the explanation of typical examples of the implementation of the logic codes given in the Recognition Logic Table for specific numerals will suffice to show the manner in which this logic table may be implemented for all numerals 1 through 0.

*Recognition Logic Table*

| Numeral | Logic Stage | Criterion Area *a b c d* | Logic Stage | Criterion Area *e f g h* |
|---|---|---|---|---|
| 1 | XU1 | [0 - 0 1] | XL1 | [1 - - 0] |
| | XU2 | [1 - - - or - - 1 - and XU1=1]' | XL2 | [- - - 1 and XL1=1]' |
| | XU3 | [0 1 0 - and XU1=1 and XU2=0] | XL3 | [- 1 1 0 and XL1=1 and XL2=0] |
| 2 | XU1 | [0 - 0 -] | XL1 | [1 - - 0] |
| | XU2 | [1 0 - 1 and XU1=1] | XL2 | [- 1 1 1 and XL1=1] |
| | XU3 | [0 - 0 - and XU2=1] | XL3 | [- - - 0 and XL2=1] |
| 3 | XU1 | [0 - 0 -] | XL1 | [- - - 0] |
| | XU2 | [1 - 0 1 and XU1=1] | XL2 | [1 0 - 1 and XL1=1] |
| | XU3 | [1 0 1 1 and XU2=1] | XL3 | [- 1 1 0 and XL2=1] |
| | XU4 | [0 1 0 - and XU3=1] | | |
| 4 | XU1 | [0 - 0 1] | XL1 | [1 - 0 0] |
| | XU2 | [0 1 1 1 and XU1=1] | XL2 | [- - - 1 and XL1=1]' |
| | XU3 | [XU1=1 or XU2=1 and 1 - - -]' | XL3 | [- 1 1 0 and XL1=1 and XL2=0] |
| | XU4 | [0 1 0 - and XU2=1 and XU3=0] | | |
| | XU5 | [XU4=1 or 4T=1 output (output from closed loop resolution circuit)] | | |

See footnote at end of table.

*Recognition Logic Table*—Continued

| Numeral | Logic Stage | Criterion Area *a b c d* | Logic Stage | Criterion Area *e f g h* |
|---|---|---|---|---|
| 5 | XU1 | [0 - 0 1] | | |
| | XU2 | [1 1 1 0 and XU1=1] | XL1 | [1 0 1 1 or 1 1 0 1 or 1 0 0 1] |
| | XU3 | [0 1 0 - and XU2=1] | XL2 | [- 1 1 0 and XL1=1] |
| 6 | XU1 | [0 - 0 1] | XL1 | [1 - - 0] |
| | XU2 | [1 - - 1 and XU1=1]' | XL2 | [1 0 - 1 and XL1=1 or 1 - 0 1 and XL1=1]' |
| | XU3 | [- 1 - 0 and XU1=1 and XU2=0] | XL3 | [1 1 1 1 and XL1=1] |
| | | | XL4 | [- 1 1 0 and XL2=0 and XL3=1] |
| 7 | XU1 | [1 0 - 1] | XL1 | [1 - - 0] |
| | XU2 | [- 1 1 - and XU1=1]' | XL2 | [- - - 1 and XL1=1]' |
| | XU3 | [0 1 0 - and XU1=1 and XU2=0] | XL3 | [- 1 1 0 and XL1=1 and XL2=0] |
| 8 | XU1 | [0 - - 1] | XL1 | [1 - - 0] |
| | XU2 | [1 1 1 1 and XU1=1] | XL2 | [1 1 1 1 and XL1=1] |
| | XU3 | [0 1 0 - and XU2=1] | XL3 | [- 1 1 0 and XL2=1] |
| 9 | XU1 | [0 - 0 1]* | XL1 | [1 - - 0] |
| | XU2 | [1 1 1 1 and XU1=1]* | XL2 | [1 0 0 0 and XL1=1] |
| | XU3 | [0 1 0 - and XU2=1]* | XL3 | [- 1 1 0 and XL2=1] |
| 0 | XU1 | [0 - 0 1] | XL1 | [1 - - 0] |
| | XU2 | [- - 1 - and XU1=1]' | XL2 | [1 1 1 1 and XL1=1] |
| | XU3 | [1 1 0 1 and XU1=1] | XL3 | [- 1 1 0 and XL2=1] |
| | XU4 | [0 1 0 - and XU2=0 and XU3=1] | | |

*Closed loop condition.

An explanation of the above Recognition Logic Table with respect to the bipolar radial scan pattern shown in FIG. 3, and of the illustrative embodiment of the implementation thereof shown in FIGS. 10 through 15, will now be given for a few representative numerals. Treating the upper and lower radial scans as independent scans, the development of the recognition logic conditions shown in the above table and the illustrative implementation thereof shown in FIG. 10 for the Arabic numeral 1 will be given. Looking only at the upper scan, it will be observed that a mark will be detected in criterion area *d* as the Arabic numeral 1 moves into the scan pattern. At the same time no marks will be detected in criterion areas *a*, *c* and *b*. At this stage of the scanning it is not known whether a mark will be detected in criterion area *b* because a portion of the previously detected character may still be present in the criterion area, and accordingly this is designated a "don't care" criterion area. Thus, as shown in the above table, the logic code condition required for the first logic stage XU1 of the upper scan for the recognition of the Arabic numeral 1 is indicated by a 0 in criterion area *a*, a — or "don't care" in criterion area *b*, a 0 in criterion area *c*, and a 1 in criterion area *d*.

The XU1 logic stage in the above table is implemented, as shown in FIG. 10, by AND gate 1001 and flip-flop 1002. AND gate 1001 has as its inputs the *a*0, *c*0, and *d*1 leads, and the presence of signals on these leads will actuate AND gate 1001 and cause it to set flip-flop 1002 to its "1" state.

As the Arabic numeral 1 passes through the scanner pattern, the previous set of line intersections will change to the following. No marks will be detected in criterion areas *a* and *c* because, as described hereinbefore, the segments of the Arabic numeral 1 extend in a longitudinal direction with respect to these criterion areas and are integrated out by the circuitry described above in connection with FIG. 8. However, there will be a mark detected in criterion area *b* and at this point there will be a "don't care" condition in criterion area *d*. This logic code condition is shown in the above table as stage XU3 for the upper scan. However, after the first stage XU1 is set and before the third stage XU3 is set, a further condition must be met. This condition is an inhibiting condition and comprises a forbidden code for the detection of the Arabic numeral 1. For example, if a horizontal line segment is detected in criterion area *a* or criterion area *c* indicating that the character being scanned is not a single vertical line as would be the case for the Arabic numeral 1, an inhibit stage is actuated. The actuation or setting of this inhibit stage prevents the logic circuitry associated with the Arabic numeral 1 from indicating that the number being scanned is the Arabic numeral 1. Referring to the table, the inhibit stage is shown as logic stage XU2 and is set if a mark is detected in criterion area *a* or if a mark is detected in criterion area *c* and the preceding stage XU1 is set. The inhibit stage XU2 for the Arabic numeral 1 as shown in the table is implemented, as shown in FIG. 10, by OR gate 1003, AND gate 1004, and flip-flop 1005. Thus, if a mark is detected in either criterion area *a* or *c* a signal will be applied to the *a*1 or *c*1 lead which will cause the actuation of OR gate 1003. The actuation of OR gate 1003 will apply a signal to the lower input of AND gate 1004 and, provided that flip-flop 1002 has been previously set, a signal from its (1) output lead will cause the actuation of AND gate 1004 which in turn will set flip-flop 1005 to its "1" state. The setting of flip-flop 1005 to its "1" state will remove the enabling signal applied to the upper input of AND gate 1006.

The third stage of logic required in the upper scan to recognize the Arabic numeral 1, that is, stage XU3 in the above table, is set when a mark is detected in criterion area *b* and no marks are detected in criterion areas *a* and *c* and stage XU1 has been previously set and stage XU2 is not set.

The XU3 logic stage for the Arabic numeral 1 in the table is implemented, as shown in FIG. 10, by AND gate 1006 and flip-flop 1007. When a mark is detected in criterion area *b* and no marks are detected in criterion areas *a* and *c*, the signals applied to the respective *a*0, *b*1 and *c*0 leads, together with a signal from the (1) output lead from flip-flop 1002 and the enabling signal obtained from the (0) output lead of flip-flop 1005 when it is set to its "0" state, will cause the actuation of AND gate 1006. The actuation of this AND gate in turn sets flip-flop 1007 to its "1" state which applies a signal from the (1) output lead to the upper input of AND gate 1008.

In a similar manner, when the Arabic numeral 1 is passed through the lower scan of the bipolar scan pattern, a mark will be detected first in criterion area *e*. At the same time no mark will be detected in criterion area *h*.

As shown in the above code table, the first logic stage for the lower scan of the Arabic numeral 1 is identified as XL1, and the logical condition is met when a signal appears on the *e*1 lead indicating detection of the mark in criterion area *e* and a signal appears on the *h*0 lead indicating that no signal was detected in criterion area *h*. Referring to FIG. 10, the first logic stage XL1 of the lower scan is implemented by AND gate 1009 and flip-flop 1010. AND gate 1009 has as its inputs the *e*1 and *h*0 leads, and when the above-described signal conditions are present on these leads AND gate 1009 will be actuated to set flip-flop 1010 to its "1" state.

The next logic state XL2 in the lower scan is an inhibiting stage. As shown in the code table given above, if, after stage XL1 is set, a mark is detected in criterion area *h* indicating that the character being scanned contains a horizontal line and accordingly cannot be the Arabic numeral 1, the logic code conditions for the inhibit stage XL2 are met and this stage is set to inhibit the remainder of the logic circuitry for translating thte character 1. As shown in FIG. 10, the inhibit stage XL2 for the Arabic numeral 1 comprises AND gate 1011 and flip-flop 1012. AND gate 1011 has as its inputs the output of flip-flop 1010 and the *h*1 lead. Accordingly, if logic stage XL1 is set, which is indicated by the operation of flip-flop 1010, and a mark is detected in criterion area *h*, AND gate 1011 will be actuated to operate flip-flop 1012 to its "1" state. When this occurs the enabling signal applied from the (0) output of flip-flop 1012 to the upper input of AND gate 1013 is removed thus disabling the third stage of the recognition logic circuitry for the Arabic numeral 1.

Referring again to the Recognition Logic Table given above, the third stage, that is, stage XL3, of logic for the lower scan of the scan pattern is set when a mark is detected in criterion areas *f* and *g* and no mark is detected in criterion area *h*. This occurs as the Arabic numeral 1 passes through the scan pattern and exits from the scan pattern to the right. If these conditions are met and logic stage XL1 has been previously set, and inhibit stage XL2 has not been set, stage XL3 will be operated.

Stage XL3 in the above table for the Arabic numeral 1 is implemented, as shown in FIG. 10, by AND gate 1013 and flip-flop 1014. AND gate 1013 has as its inputs the *f*1, *g*1 and *h*0 leads, the (0) output lead from flip-flop 1012 and the (1) output lead from flip-flop 1010. The actuation of AND gate 1013 will in turn operate flip-flop 1014. When flip-flop 1014 is operated to its "1" state, a signal will be applied to the lower input of AND gate 1008. The coincidence of the signals on the upper and lower inputs of AND gate 1008 when all of the logic conditions for the recognition of the Arabic numeral 1 have been met will cause the actuation of AND gate 1008 to apply a signal on the (1) lead to indicate the recognition of the Arabic numeral 1.

A specific explanation of the above logic code table for the Arabic numerals 4 and 9, and a specific description of an illustrative implementation thereof, will be given hereinafter. As indicated hereinbefore, and in accordance with the present invention, a resolution circuit is provided to distinguish closed-top 4's from 9's. This resolution circuit will be described hereafter in connection with the logic codes and implementation thereof for the Arabic numeral 9.

The Arabic numeral 4 is somewhat different from the remaining Arabic numerals in that in the present invention two different configurations of the numeral 4 may be recognized. The first is the open-top 4 and the second is the closed-top 4. Treating each of the scans of the bipolar scan pattern as individual scans and taking the upper scan first, it will be noted that as the numeral 4 with an open top moves into the scan pattern criterion area *d* in the upper scan will be the first to detect a mark. As shown in logic stage XU1 for the numeral 4 in the code table given above, when a mark is detected in criterion area *d* and marks are not detected in criterion areas *a* and *c*, logic stage XU1 will be set. The implementation of logic stage XU1 is shown in FIG. 12 by AND gate 1201 and flip-flop 1202. AND gate 1201 has as its inputs the *a*0, *c*0 and *d*1 leads and is actuated by signals on these leads to set flip-flop 1202 to its "1" state.

As the open-top numeral 4 moves on through the scan pattern, the second logic stage XU2 shown in the above table will be operated in response to the detection of a mark in criterion areas *b*, *c* and *d* and no mark in criterion area *a*. This, in combination with the setting of the preceding stage XU1, will cause the second stage XU2 to be set. The implementation of this logic stage is shown in FIG. 12 by AND gate 1203 and flip-flop 1204. AND gate 1203 has as its inputs the *a*0, *b*1, *c*1 and *d*1 leads and the (1) output lead from flip-flop 1202. The actuation of AND gate 1203 will in turn set flip-flop 1204 to its "1" state.

The next stage, that is, stage XU3, as shown in the above logic table, is an inhibit stage and is set if stage XU1 or stage XU2 is set and a mark is detected in criterion area *a*. If these conditions are met, the character being scanned cannot be an open-top 4. When inhibit stage XU3 is set it inhibits the succeeding logic circuitry for the Arabic numeral 4. The implementation of logic stage XU3 for the Arabic numeral 4 is shown in FIG. 12 and comprises OR gate 1205, AND gate 1206 and flip-flop 1207. OR gate 1205 has two inputs, one the output of flip-flop 1202 and the other the output of flip-flop 1204. If each or both of these flip-flops are set, OR gate 1205 will be actuated to apply a signal to an input of AND gate 1206. The other input of AND gate 1206 is connected to the *a*1 lead and, thus, if a mark is detected in criterion area *a* and either flip-flop 1202 or flip-flop 1204 is operated, AND gate 1206 will be actuated to operate flip-flop 1207 to its "1" state. The operation of flip-flop 1207 to its "1" state will remove the enabling signal applied from the (0) output lead to the upper input of AND gate 1208.

The fourth stage in the above logic table, that is, stage XU4, for the Arabic numeral 4, is set when a mark is detected in criterion area *b*, no marks are detected in criterion areas *a* and *c*, stage XU2 is set, and stage XU3, the inhibit stage, is not set. As shown in FIG. 12, the implementation of logic stage XU4 for the numeral 4 comprises AND gate 1208 and flip-flop 1209. As shown, the inputs of AND gate 1208 are connected to the *a*0, *b*1 and *c*0 leads with an input connected from the (1) output of flip-flop 1204 and the (0) output of flip-flop 1207. Thus, if flip-flop 1204 is set and flip-flop 1207 is not set, and signals are present on leads *a*0, *b*1 and *c*0, AND gate 1208 will be actuated to operate flip-flop 1209 to its "1" state.

Referring to the above code table for the Arabic numeral 4, it will be noted that the fifth logic stage XU5 for the lower scan is an OR condition and is set if the preceding XU4 stage is set or if a signal is applied to the 4T lead. The 4T lead will have a signal applied thereto, as will be described hereinafter, when in response to the detection of a closed loop on the upper scan the closed loop resolution circuit determines that the closed loop is a part of a closed-top numeral 4 rather than a part of a numeral 9. Referring to FIG. 12, stage XU5 for the numeral 4 is implemented by OR gate 1210 and and flip-flop 1211. Or gate 1210 has one input connected to the output of flip-flop 1209 and has another input connected to the 4T lead which extends to the closed loop resolution circuit shown in FIG. 13. Accordingly, if flip-flop 1209 is set to its "1" state or if a signal is applied to the 4T lead, OR gate 1210 will be actuated to in turn set flip-flop 1211 to its "1" state. The setting of flip-flop 1211 to its "1" state applies a signal to the upper input of AND gate 1212.

In a similar manner, when the Arabic numeral 4 is passed through the lower scan of the bipolar scan pattern, a mark will first be detected in criterion area *e*. At this time a "don't care" condition will be present in criterion area *f* and no marks will be detected in criterion areas *g* and *h*. Referring to the above logic code table, it will be noted that the first logic stage XL1 for the lower scan of the Arabic numeral 4 is met when a mark is detected in criterion area *e* and no marks are detected in criterion areas *g* and *h*. Referring to FIG. 12, stage XL1 for the Arabic numeral 4 is implemented by AND gate 1213 and flip-flop 1214. AND gate 1213 has as its inputs the *e*1, *g*0, and *h*0 leads, and when the signals are applied to these leads AND gate 1213 will be actuated to set flip-flop 1214 to its "1" state.

The second logic stage in the lower scan for the Arabic numeral 4 is an inhibit stage and, as shown in the above table, when a mark is detected in criterion area *h* and stage XL1 has been set, the inhibit stage XL2 will be set to inhibit the remaining recognition logic for the Arabic numeral 4. The implementation of inhibit stage XL2 for the Arabic numeral 4 consists, as shown in FIG. 12, of AND gate 1215 and flp-flop 1216. AND gate 1215 has two inputs, one connected to the *h*1 lead and the other connected to the (1) output of flip-flop 1214. Accordingly, if flip-flop 1214 is set to its "1" state and a mark is detected in criterion area *h*, AND gate 1215 will be operated to set flip-flop 1216 to its "1" state. The setting of flip-flop 1216 to its "1" state removes the enabling signal from the (0) output lead therefrom which is connected to the lower input of AND gate 1217 and thus disables the recognition logic circuitry for the Arabic numeral 4.

The third logic stage XL3 in the lower scan for the recognition of the Arabic numeral 4, as shown in the above table, is met when a mark is detected in criterion areas *f* and *g* and no mark is detected in criterion area *h* provided that stage XL1 is set and stage XL2 is not set. The implementation of stage XL3 consists, as shown in FIG. 12, of AND gate 1217 and flip-flop 1218. AND gate 1217 has as its inputs the *h*0, *g*1, *f*1 leads, the (1) output of flip-flop 1214, and the (0) output of flip-flop 1216. Accordingly, if marks are detected in criterion areas *f* and *g*, no marks are detected in criterion area *h*, and, if flip-flop 1214 is set to its "1" state and flip-flop 1216 is set to its "0" state, AND gate 1217 will be operated to set flip-flop 1218 to its "1" state. The actuation of flip-flop 1218 to its "1" state applies a signal to the lower input of AND gate 1212. The coincidence of signals on the upper and lower inputs of AND gate 1212 when all the logic stages of the recognition logic for the Arabic numeral 4 have been set will cause the actuation of AND gate 1212 to apply a signal on the 4 lead to indicate the recognition of an Arabic numeral 4.

As the Arabic numeral 9 moves into the scan pattern a mark will first be detected in criterion area *d*. At the same time no marks will be detected in criterion areas *a* and *c*. At this time criterion area *b* will be a "don't care" area. As shown in the above table, stage XU1 of the lower scan for the Arabic numeral 9 occurs when the above conditions are fulfilled. The implementation of stage XU1 for the numeral 9 is shown in FIG. 13 of the drawing and consists of AND gate 1301 and flip-flop 1302. AND gate 1301 has inputs connected to the *a*0, *c*0 and *d*1 leads, and accordingly when a mark is detected in criterion area *d* and no marks are detected in criterion areas *a* and *c* AND gate 1301 will be actuated to set flip-flop 1302 to its "1" state.

As shown in the above logic table, stage XU2, the second stage for the lower scan of the numeral 9, is fulfilled when a mark is detected in each of criterion areas *a*, *b*, *c*, and *d*, and the preceding stage XU1 has been set. The implementation of stage XU2 comprises, as shown in FIG. 13, AND gate 1303 and flip-flop 1304. As shown in FIG. 13, AND gate 1303 has inputs connected to the *a*1, *b*1, *c*1, *d*1 leads, and the (1) output lead from flip-flop 1302. Thus, if a mark is detected in each of the criterion areas *a*, *b*, *c*, and *d*, and flip-flop 1302 has been previously set, AND gate 1303 will be actuated to set flip-flop 1304 to its "1" state. The signal on the (1) output lead from flip-flop 1304 is applied to gate 1307 and to the upper input of AND gate 1305.

Referring again to the logic table given above, the third stage XU3 of the lower scan for the numeral 9 is set when a mark is detected in criterion area *b*, and no marks are detected in criterion areas *a* and *c* provided the preceding stage XU2 has been set. The implementation stage XU3 for the Arabic numeral 9 is shown in FIG. 13 and comprises AND gate 1305 and flip-flop 1306. AND gate 1305 has one input connected to the (1) output of flip-flop 1304 and other inputs connected to the *a0*, *b1* and *c0* leads. The actuation of AND gate 1305 in response to signals on the input leads thereto sets flip-flop 1306 to its "1" state. When flip-flop 1306 is set to its "1" state, a signal is applied to lead 1308 which extends to the lower inputs of AND gates 1309 and 1310. As indicated in the above logic table, the setting of stages XU1, XU2 and XU3 for the Arabic numeral 9 indicates the detection of a closed loop condition on the upper scan. This closed loop condition may be present if either the Arabic numeral 9 or a closed-top Arabic numeral 4 is being scanned. Before discussing the closed loop resolution circuit, which in accordance with the present invention determines whether the closed loop condition detected by the setting of stages XU1, XU2, and XU3 described above is a closed loop in an Arabic numeral 4 or an Arabic numeral 9, the remaining logic codes and the implementation thereof for the Arabic numeral 9 will be described.

Referring to the above logic code table, it will be noted that when the Arabic numeral 9 moves into the scan pattern a mark will be detected in criterion area *e* of the lower scan and a mark will not be detected in criterion area *h*. This is shown as logic stage XL1 in the table. The implementation of the XL1 logic stage for the numeral 9, as shown in FIG. 13, comprises AND gate 1313 and flip-flop 1314. When signals are present on the *e1* and *h0* leads, AND gate 1313 will be actuated to set flip-flop 1314 to its "1" state.

The second logic stage XL2 for the lower scan of the numeral 9, as shown in the above table, is met when a mark is detected in criterion area *e* and no marks are detected in criterion areas *f*, *g* and *h*, provided that stage XL1 has been previously set. The implementation of stage XL2 for the Arabic numeral 9 is shown in FIG. 13 as AND gate 1315 and flip-flop 1316. AND gate 1315 has as its inputs the *e1*, *f0*, *g0*, *h0* leads and the (1) output lead from flip-flop 1314. Accordingly, if signals are present on the *e1*, *f0*, *g0*, *h0* leads and flip-flop 1314 is set to its "1" state, AND gate 1315 will be actuated to set flip-flop 1316 to its "1" state.

The third stage XL3 of logic for the lower scan of the Arabic numeral 9, as shown in the above logic table, is met when marks are detected in criterion areas *f* and *g* and no marks are detected in criterion area *h*, provided that the previous stage XL2 has been set. The implementation of logic stage XL3 for the numeral 9 is shown in FIG. 13 and comprises AND gate 1317 and flip-flop 1318. AND gate 1317 has inputs connected to the *f1*, *g1* and *h0* leads as well as the (1) output lead from flip-flop 1316. Accordingly, if signals are present on these leads, AND gate 1317 will be actuated to set flip-flop 1318 to its "1" state. The setting of flip-flop 1318 to its "1" state will apply a signal to the lower input of AND gate 1319. As will be described hereafter, a signal will be applied to the upper input of AND gate 1319 from the output of AND gate 1310 in the closed loop resolution circuit if the numeral being scanned is the Arabic numeral 9, and accordingly AND gate 1319 will be actuated to apply a signal to the 9 lead to indicate the recognition of the Arabic numeral 9.

CLOSED LOOP RESOLUTION CIRCUIT

As indicated hereinbefore, an important aspect of the present invention is directed to a resolution circuit for resolving ambiguities between scanned characters by first detecting a character closure and then utilizing the number of corners in the configuration of the closure to resolve the ambiguities. As described above, when a closed loop condition is detected on the upper scan of the bipolar scan pattern, it is not known whether this closed loop is a part of a closed-top numeral 4 or a numeral 9. The fact that the numeral is a 9 or a 4 is determined by the closed loop resolution circuit of the present invention shown in FIG. 13. If the numeral is a 9 the number of corners is at most one, while in the case of a closed-top numeral 4 the number of corners is normally three. Prior to a description of the specific embodiment of the closed loop resolution circuit given in FIG. 13, the basic principle of operation of this circuit will be described with reference to FIGS. 17A, 17B and 17C.

The basic principle of operation of the closed loop resolution circuit of the present invention is to obtain a signal which is proportional to the distance from the center of a scan to the closed loop configuration for a complete scan cycle of 360 degrees. If the scan center is inside a circle, as shown in FIG. 17A, the output signal obtained in this manner will be a smooth curve. Referring to FIG. 17A, if the center of the scan is located at a point *ij* inside a circle, the length of the vector radius $r_{ij}$ will vary in a smooth manner as the radius vector rotates through 360 degrees. The curve thus obtained is shown on the right in FIG. 17A and plots the angle $\theta$ and vector radius length $r_{ij}$ for 360 degrees of rotation.

If the scan center is inside a triangle, a smooth curve superimposed upon a curve having three cusps will be obtained. This is illustrated in FIG. 17B where the radius vector $r_{ij}$ is rotated through 360 degrees about a point *ij* inside the triangle. The resulting curve is shown on the right in FIG. 17B and has three cusps formed by the discontinuities caused by the corners of the triangle.

As shown in FIG. 17C, a similar curve is developed for a four-sided figure and the resulting curve is one having four cusps or discontinuities. Referring to FIGS. 17A, 17B and 17C, it will be observed that a circle provides no cusps in the resulting output curve, whereas a three-sided triangular figure provides three cusps and a four-sided figure provides four cusps in the resulting curves. In accordance with the present invention, the cusps in such resulting curves are advantageously utilized to distinguish closed configurations in scanned characters to resolve ambiguities.

Referring now to FIG. 13, a specific embodiment of the closed loop resolution circuit, in accordance with the present invention described in connection with FIGS. 17A through 17C, will be described. As indicated hereinbefore, when a closed loop condition is detected in the upper scan of the bipolar radial scan pattern, flip-flop 1304 will be set to its "1" state. This will apply a signal to the upper input of AND gate 1305 and to the control input of gate 1307. The input of gate 1307 is connected to the THO lead which extends to the output of threshold circuit 804 shown in FIG. 8. As described hereinbefore, 128 radial scans are made from each of the scan centers in the bipolar scan pattern. As each of these scans is generated the light reflections resulting therefrom are picked up by photomultiplier PMC, amplified in amplifier 803, and applied to threshold circuit 804. Accordingly, the output of threshold circuit 804 gives an indication if a mark or a line is intersected on each of the 128 scans. There is no integration of the output of threshold circuit 804 applied to the THO lead, as was described hereinbefore in connection with the binary counter BC2, and therefore the time of the respective signal pulses applied to the THO lead represents the time of crossing of a scanned line or mark on each radial scan. In other words, when a clock pulse from clock pulse source 600 generates a particular radial scan, the time delay between the start of this scan and the crossing of a line or mark is measurable by the delay from the start of this particular scan until a signal is applied from the output of threshold circuit 804 to the THO lead.

Referring back to FIG. 13, it will be observed that the signals applied to the THO lead are gated through gate 1307 and applied to the control input of gate 1320. The input of gate 1320 is connected to the STV lead which extends to the output of sawtooth generator 900. The sawtooth voltage from the output of sawtooth generator 900 is thus applied to gate 1320 over the STV lead. This sawtooth voltage is the voltage which is utilized in the manner described hereinbefore to generate the radial sweeps of the beam of the flying spot scanner from the central point of the scan to the outer radius. The output of gate 1320 is therefore a voltage pulse obtained at the instant a pulse from the threshold circuit 804 is applied over lead THO through gate 1307 to gate 1320. The magnitude of this voltage pulse corresponds to the distance from the center of the scan to the point where the scan crosses a line or mark. Thus the output of gate 1320 is a succession of 128 pulses per scan rotation, one for each of the successive radial scans, and the amplitude of each of these pulses is proportional to the distance from the center of the scan to the intersected line segment of the closed loop configuration. If the scan center is located inside the circular closed loop configuration of a numeral 9, the envelope of the resulting voltage pulses will be a smooth curve similar to that shown in FIG. 17A. On the other hand, if the scan center is located inside the triangular closed loop configuration of the closed-top numeral 4, the envelope of the resulting voltage pulses will be a curve having three cusps similar to that shown in FIG. 17B.

As described hereinbefore, the repetition frequency of the scan cycle is advantageously set so that each character is scanned a plurality of times by the bipolar scan pattern as the field of the character moves through the scan pattern of flying spot scanner FSS. Thus the 128 voltage pulses obtained from the output of gate 1320 for each scan cycle are repeatedly applied to the output lead from gate 1320. These successive voltage pulses are applied to band-pass filter 1321, the midband frequency of which is advantageously set to be three times the scan repetition frequency. Thus if the envelope of the voltage pulses applied to the input of band-pass filter 1321 contains three cusps for each repetition cycle, a signal will be obtained from the output of band-pass filter 1321 and applied to amplifier 1323. On the other hand, if the envelope of the voltage pulses applied to band-pass filter 1321 contains no cusps or, at the most, one cusp, band-pass filter 1321 will apply no signal from its output to amplifier 1323. The signal obtained from the output of band-pass filter 1321 is amplified in amplifier 1323 and applied to threshold circuit 1324. The output of threshold circuit 1324 is applied to the input of flip-flop 1312 and causes this flip-flop to be set to its "1" state.

Accordingly, if the closed loop configuration detected by AND gate 1303 and flip-flop 1304, in the manner described hereinbefore, is a closure of a closed-top numeral 4, a signal will be applied to set flip-flop 1312 to its "1" state. On the other hand, if the closed loop configuration detected by AND gate 1303 and flip-flop 1304 is a closure of a numeral 9, no signal will be applied to flip-flop 1312 and it will remain in its "0" state.

If flip-flop 1312 is set to its "1" state indicating that the closed loop of a closed-top numeral 4 has been scanned, the signal applied from the (1) output thereof in coincidence with the signal applied from the (1) output of flip-flop 1306 over lead 1308 will cause the actuation of AND gate 1309. The actuation of AND gate 1309 will apply a signal to the 4T lead which extends to OR gate 1210 shown in FIG. 12 to cause the actuation of the logic circuitry for the numeral 4. With flip-flop 1312 remaining in its "0" state the signal applied from the (0) output lead therefrom in coincidence with the signal applied to lead 1308 will cause the actuation of AND gate 1310. The actuation of this AND gate in turn applies a signal to the upper input of AND gate 1319 which in coincidence with the signal from the (1) output of flip-flop 1318 as described hereinbefore will cause the actuation of AND gate 1319 and the application of a signal to the 9 lead to indicate the recognition of the numeral 9.

It is of course obvious that the above-described specific embodiment of the closed loop resolution circuit of the present invention may be utilized with equal advantage to resolve ambiguities in characters other than the Arabic numeral 9 and the closed-top numeral 4. For example, by utilizing this aspect of the present invention, the ambiguity between the letter D and the letter O may be resolved. The envelope of the voltage pulses obtained from a plurality of radial scans emanating from a scan center inside the letter D will contain two cusps whereas the envelope of the voltage pulses from a plurality of radial scans from a scan center inside the letter O will contain no cusps, and accordingly the letter D and the letter O may be distinguished. It is also to be understood that this aspect of the present invention is not limited to resolving ambiguities between scanned characters and may be utilized in any type of pattern recognition problem to distinguish patterns such as circles, triangles, squares, et cetera.

It is to be further understood that this aspect of the invention is not limited to the specific implementation utilizing the band-pass filter described above. For example, the successive voltage pulses whose amplitude corresponds to the distance from the center of a rotating radial scan to an intersected closure configuration may be applied to a low pass filter. The output of this filter may then be differentiated to provide an input to a simple counter to count the number of cusps present in the envelope of the voltage pulses. This counter may be reset periodically in synchronism with the scan cycle.

OUTPUT CIRCUIT AND LOGIC RESET CIRCUIT

As shown in FIGS. 10 through 15, the output leads from the individual logic circuits which are utilized to recognize a scanned numeral are applied to utilization circuit 1500. This utilization circuit may be any type of circuit known in the art which in response to the machine language appearing on one of the leads 0 through 9 performs an operation such as punching a card or recording the information on a magnetic tape. When a signal is applied to any of the output leads to indicate the recognition of a character, OR gate 1501 shown in FIG. 15 is also actuated. The output of OR gate 1501 is applied to a delay circuit 1502 where the signal is delayed for a predetermined interval before being applied to the RS reset lead. The RS reset lead extends to all of the flip-flop circuits of the individual recognition logic shown in FIGS. 10 through 15 to reset the flip-flops to their normal state. Thus, as soon as a character is recognized, the logic is reset in preparation for recognition of the next character to be scanned which may be next to it on the document.

The output of OR gate 1501 is also applied to the reset inputs of binary counter BC6 shown in FIG. 15. The input of binary counter BC6 is connected to the *t*(128—255) lead which extends to the synchronizing circuits of FIGS. 6 and 7. As indicated hereinbefore, lead *t*(128—255) will have a signal applied thereto once during each scan cycle of the bipolar scan pattern. Each of the signals applied to this lead is counted in binary counter BC6. Binary counter BC6 may advantageously have any desired number of stages, the number being determined by the speed of operation of the document carriage speed. Thus if, after a predetermined number of scan cycles of the bipolar radial scan pattern on a particular character in the field of the scanner, a recognition of the character is not made, OR gate 1501 will not be actuated and the threshold count in binary counter BC6 will be reached. This will cause a signal to be applied to the output lead AL of this counter which may advantageously extend to a reject alarm circuit to indicate that the scanner failed to recognize a particular character. On the other hand, if a scanned character is recognized before the threshold count in counter BC6*a* is reached, the signal applied from OR gate 1501 will reset counter BC6*a* to its "0" state to prepare the counter for operation with the next character scanned.

AUTOMATIC SCAN REGISTRATION CIRCUIT

As indicated hereinbefore, an aspect of the present invention is directed to the automatic registration of the light spot from flying spot scanner FSS on the two central guide lines 1*b* and 1*c* shown in FIGS. 1 and 2 as the field of the characters to be recognized moves through the bipolar radial scan pattern in the manner shown in FIG. 4. This automatic registration takes place currently with the scanning of the characters and accordingly works in parallel with a recognition logic circuitry utilized to identify the scanned characters.

As shown in FIG. 4 and as pointed out previously, the light pattern from flying spot scanner FSS is focused on the paper or form upon which the characters to be recognized appear by a lens system designated SL. The light pattern from the character field is reflected back, focused into two beams and directed to two separate positions. One is focused through a color filter and lens system designated FLC to a photomultiplier designated PMC, the output of which controls the recognition logic circuitry of the present invention in the manner described hereinbefore. The other beam is directed through a color filter and lens system designated FLR to photomultiplier PMR. Photomultiplier PMR is also shown in FIG. 9. Because, as indicated hereinbefore, the alpha-numeric characters to be recognized are written or printed in one color of ink whereas the guide lines with respect to which the characters are written are a different color of ink, the light reflections indicating traversals of the respective lines, that is, the lines of the characters and the guide lines, will be directed to the respective photomultipliers PMC and PMR.

As shown in FIG. 9, the output of photomultiplier PMR is applied to amplifier 918. Photomultiplier PMR sees a continuous light reflection as a radial scan starts from the center and moves toward the edge. If this scan is intersected on a guide line, the light intensity reflected to photomultiplier PMR will be reduced. The output of photomultiplier PMR is therefore a voltage which has a specific direct-current level until a guide line is encountered. As the scan passes over the guide line, the output of photomultiplier PMR will then be a pulse with a negative direction. If a particular scan intersects more than one guide line, the output of photomultiplier PMR will accordingly be more than one negative pulse. These negative pulses are amplified in amplifier 918 and applied to threshold circuit 919. Threshold circuit 919 will distinguish, at some predetermined threshold, weak pulses caused by reflections of dirt spots or smudges from storing pulses indicating the intersection of one or more of the guide lines. The output of threshold circuit 919 is applied to an input of AND gate 920 and an input of AND gate 921.

Referring to FIGS. 3 and 5 of the drawing, it will be noted that criterion area *a* in the upper scan and criterion area *h* in the lower scan are vertically oriented and can advantageously be used to produce information as to the registry of the electron beam of flying spot scanner FSS with respect to the guide lines. It will be noted that if the scan centers of the bipolar radial pattern are properly centered on guide lines 1*b* and 1*c*, criterion area *a* will intersect one guide line and criterion area *h* will likewise intersect one guide line. However, if the scanning pattern is centered below the two central guide lines, a configuration of two intersections in criterion area *a* will be obtained with one intersection in criterion area *h*. For every specific configuration of error, whether it be to the top or to the bottom or a specific distance away from the two central guide lines, there is a specific combination of intersections in criterion areas *a* and *h*. With each of these combinations, there will be required a specific action to center the electron beam of flying spot scanner FSS at its proper location. In the illustrative embodiment of the present invention, the actions required to center the electron beam of flying spot scanner FSS to its proper location are divided into a plurality of increments. These increments may be as coarse or as fine as required and the number of such increments may also be selected as required. If the scan centers are close to their proper position, an action requiring the movement of one increment will be produced. On the other hand, if the scan centers are farther away from their required position, a command to move two increments may be produced, and, similarly, if the scan centers are out of proper registration by a considerable distance, a command to move four increments will be produced.

Referring to FIG. 3, an illustrative list of the possible combinations of intersections, together with the specific action required, will be described. If two guide lines are intersected in criterion area *a* and a single guide line is intersected in criterion area *h*, an action should be taken to move the scan centers up one increment, as it will be observed that the centers are below the two central guide lines. If a single guide line is intersected in criterion area *a* and two guide lines are interescted in criterion area *h*, an action should be taken to move the electron beam of flying spot scanner FSS down one increment. Similarly, if a single guide line is intersected in criterion area *a* and none are intersected in criterion area *h*, the scan centers of the electron beam of flying spot scanner FSS should be moved up a double increment as this is indicative that the centers are a greater distance from their proper locations. On the other hand, if no guide lines are intersected in criterion area *a* and one guide line is intersected in criterion area *h*, the electron beam of flying spot scanner FSS should be moved down a double increment as it is improperly centered above the central guide lines by a considerable distance. If two guide lines are intersected in criterion area *a* and none are intersected in criterion area *h*, the scan centers of flying spot scanner FSS are located a considerable distance from their proper positions and a command to move up four increments will result. If the reverse is true, that is, if no guide lines are intersected in criterion area *a* and two guide lines are intersected in criterion area *h*, the command to move down four increments will result. When the scan centers are properly located on the two central guide lines, criterion area *a* and criterion area *h* will both intersect one guide line, a stable or centered position is indicated, and no action is required.

The manner in which the error signals are generated, in accordance with an illustrative embodiment of the present invention, will be described with reference to FIG. 9. As indicated hereinbefore, the output of threshold circuit 919, which is applied to AND gate 920 and AND gate 921, will be signal pulses whenever guide lines are intersected on any of the radial scans from the two scan centers. The lower input of AND gate 920 is connected to lead *t*(24) which, as indicated hereinbefore, has a signal applied to it when the 24th radial scan from the upper scan center of the bipolar radial scan pattern is generated. Referring to FIG. 5, it will be noted that this is the first scan of criterion area *a* and accordingly any light reflections received by photomultiplier PMR indicating a crossing of a guide line during the 24th radial scan will be gated through AND gate 920 and applied to two-stage binary counter BC4T.

Thus, if during the 24th radial scan of the upper center a guide line is intersected, AND gate 920 will be actuated to set stage (1) of binary counter BC4T to its "1" state. Similarly, if two guide lines are intersected on the 24th radial scan, vinary counter BC4T will be set to indicate a count of 2.

The upper input of AND gate 921 is connected to lead t(216) which, as indicated hereinbefore, has a signal applied to it when radial scan 216 from the lower center of the bipolar radial scan pattern is generated. As shown in FIG. 5, scan 216 is the first radial scan of criterion area h and, in a manner similar to that described above, the pulses indicating the intersections of guide lines on scan 216 from the lower center of the bipolar radial scan pattern are applied to two-stage binary counter BC4B.

The (0) and (1) output leads from the respective stages of binary counters BC4T and BC4B are combined in a translation circuit comprising AND gates 922 through 927, OR gates 928 through 932, and AND gates 933 and 934 to provide signal voltages indicating the commands, up one increment, down one increment, up two increments, down two increments, up four increments and down four increments. These command functions are synchronized to take place after each cycle of the bipolar radial scan. In other words, after the number of guide line intersections occurring in radial scan 24 have been set in binary counter BC4T, and after the number of guide line intersections occurring in radial scan 216 have been set in binary counter BC4B, a signal will be applied to lead t(220) which will gate the output of the translation logic circuitry to accumulator ACU. After the output has been gated to accumulator ACU, the stages of binary counters BC4T and BC4B are reset to their "0" state by a signal applied to lead t(224—255). Thus these binary counters are reset to zero and are ready to determine the number of guide line intersections occurring on the next scan cycle in radial scans 24 and 216.

Referring to FIG. 9, the circuit which translates the output signals from the respective stages of binary counters BC4T and BC4B will be described. If counter BC4T is set to a count of 0 indicating the intersection of no guide lines on radial scan 24, and counter BC4B is set to a count of 2 indicating the intersection of two guide lines on radial scan 216, the signals on the (0) output lead of stage (1) and the (0) output lead of stage (2) of binary counter BC4T are combined with the signals applied to the (0) output lead of stage (1) and the (1) output lead of stage (2) of binary counter BC4B in AND gate 922. The actuation of AND gate 922 applies a signal to lead 4D which extends to OR gate 932 and OR gate 929. The actuation of OR gate 932 applies a signal to the DN lead indicating that the scan centers of the electron beam of flying spot scanner FSS should be moved in a down direction. At the same time the signal applied to lead 4D will cause the actuation of OR gate 929 which applies a signal to lead C4. The signal on the C4 lead indicates that the electron beam is to be moved four increments. When a signal is applied to lead t(220) as described hereinbefore, AND gate 933 will be actuated to apply a signal to lead C4'. The DN and C4' leads are connected to accumulator ACU which, in response to the signals applied thereto, will direct the movement of the scan centers of the electron beam of flying spot scanner FSS down four increments as will be described later. After this action is taken and before the next scan cycle commences, the signal applied to lead t(224—255) resets the respective stages of binary counters BC4T and BC4B to their "0" state in preparation for the next scan cycle.

In a similar manner, if binary counter BC4T is set to a count of 2 indicating the intersection of two guide lines on radial scan 24 and binary counter BC4B is set to a count of 0 indicating the intersection of no guide lines on radial scan 216, the signals on the (0) output lead of stage (1) and the (1) output lead of stage (2) of binary counter BC4T are combined with the signals applied to the (0) output lead of stage (1) and the (0) output lead of stage (2) of binary counter BC4B in AND gate 923. The actuation of AND gate 923 applies a signal to lead 4U which extends to OR gate 928 and OR gate 929. The actuation of OR gate 928 applies a signal to the UP lead indicating that the scan centers of the electron beam of flying spot scanner FSS should be moved in an up direction. At the same time the signal applied to lead 4U will cause the actuation of OR gate 929 which applies a signal to lead C4. As described above, the signal on lead C4 indicates the electron beam is to be moved four increments, and when a signal is applied to lead t(220) AND gate 933 will be actuated to apply a signal to lead C4'. The UP and C4' leads are connected to accumulator ACU which in response to the signals applied thereto will direct the movement of the scan centers of the electron beam of flying spot scanner FSS up four increments. Before the next scan cycle is started, binary counters BC4T and BC4B are reset by the signal applied to lead t(224—255).

In a manner similar to that described above, the count registered in binary counters BC4T and BC4B will cause the actuation of AND gates 924 through 927 which in turn will apply signals to leads 2D, 2U, 1D and 1U respectively. The signals applied to leads 2D or 2U will cause the actuation of OR gate 930 which in turn applies a signal to lead C2 to indicate that the two centers of the electron beam of flying spot scanner FSS are to be moved two increments. In a manner similar to that described above, the signal on lead 2D also causes the actuation of OR gate 932 indicating that the scan centers are to be moved in the down direction, whereas the signal on lead 2U causes the actuation of OR gate 928 which in turn applies a signal to the UP lead indicating that the scan centers are to be moved in the up direction. Similarly, signals applied to lead 1D or 1U will cause the actuation of OR gate 931. The actuation of OR gate 931 will apply a signal to the C1 lead indicating that the scan centers of the electron beam of flying spot scanner FSS are to be moved one increment. The signal on lead 1D also causes the actuation of OR gate 932 which applies a signal to the DN lead indicating that the scan centers are to be moved in the down direction. A signal applied to lead 1U causes the actuation of OR gate 928 which applies a signal to the UP lead indicating that the scan centers are to be moved in the up direction. Accordingly, the output leads from the translation circuit described above provide signals indicating the number of increments that the scan centers of the electron beam of flying spot scanner FSS are to be moved and the direction of this movement. If the scan centers are to be moved four increments, lead C4 will have a signal applied thereto. If the scan centers are to be moved two increments, a signal will be applied to lead C2 and, similarly, if the scan centers are to be moved one increment a signal will be applied to lead C1. If the movement is to be made in the up direction a signal will be applied to the UP lead, whereas if the movement is to be made in the down direction a signal will be applied to the DN lead. It is pointed out that signals are applied to the DN and UP leads prior to the actuation of AND gates 933, 934, or 935 by the signal applied to lead t(220). The signals on the DN or UP leads enable AND gates in accumulator ACU so that the accumulator will count up or down as required when it receives a command signal over the C4', C2', or C1' lead indicating the number of increments to be added or subtracted from the present count in accumulator ACU. When a signal is applied to lead t(220), accumulator ACU will be controlled to direct the movement of the scan centers of flying spot scanner FSS in the direction and the number of increments indicated on the output leads from the above-described translation circuit. If a signal is applied to lead C4 at the time that the signal is applied to lead t(220), the C4' lead extending to accumulator ACU will have a signal applied thereto by the actuation of AND gate 933. Similarly, if a signal is present on the C2 lead at the time that the signal is applied to lead t(220), AND gate 934 will be actuated to apply a signal to lead C2' extending to accumulator ACU. Lastly, if a signal is present on the C1 lead at the time that the signal is applied to lead t(220), AND gate 935 will be actuated to apply a signal to lead C1' extending to accumulator ACU.

As indicated hereinbefore, the possible locations of the scan centers of the electron beam of flying spot scanner FSS from a maximum distance below the guide lines to a maximum distance above the guide lines are divided into a plurality of increments and the scan centers are moved one, two, or four of these increments in either the up or down direction in response to the signals from the output of the translation circuit described above. The actual control of the movement of the electron beam of flying spot scaner FSS is effected by accumulator ACU shown in FIG. 9. This accumulator, which is in effect a reversible binary counter capable of counting up or down in steps of 1, 2 and 4 from any accumulated count, contains a plurality of binary stages (1), (2), (4) . . . (N). Each of the binary stages of accumulator ACU is a typical binary stage which in response to successive input signals is set to its alternate states. Each has a pair of output leads designated (0) and (1), and when a stage is in its "1" state the (1) output lead therefrom will have a steady state voltage applied thereto. When the stage is in its "0" state the (0) output lead therefrom will have a steady state voltage applied thereto.

Referring to FIG. 9, it will be observed that each of the (0) and (1) output leads of each stage of accumulator ACU is connected to an RC circuit and the output of this RC circuit is connected to an input of an AND gate. For example, the (1) output lead of stage (1) of accumulator ACU is connected to the RC circuit comprising condenser C(1)1 and resistance R(1)1. The other terminal of condenser C(1)1 is connected to the upper input of AND gate 943. Similarly, the (0) output lead of stage (1) of accumulator ACU is connected to an RC circuit comprising condenser C(1)0 and resistance R(1)0 with the other terminal of condenser C(1)0 connected to an input of AND gate 942. If stage (1), for example, is in its "1" state and is set to its "0" state by a signal applied to its input, a short signal pulse commonly referred to as a "carry signal" will be applied through condenser C(1)0 to the input of AND gate 942. Similarly, if stage (1) is in its "0" state and is set in its "1" state by a signal applied to its input, a short signal pulse commonly referred to as a "borrow signal" will be applied through condenser C(1)1 to the input of AND gate 943. The time constant of the RC circuits in each of the (0) or (1) output leads is such that no steady state voltage signal is applied to the respective AND gates in the output after the "carry" or "borrow" signals are generated during the switching time of the binary stage.

Sufficient binary stages are provided in accumulator ACU to accumulate or count the total number of increments that the scan centers of the electron beam of flying spot scanner FSS may be moved. Assume, for example, that accumulator ACU contains eight binary stages. Accordingly, it can accumulate or count a total number of increments from 0 to 255 and may count up or down in steps of 1, 2, or 4 increments in response to the command function signals described above. The (1) output lead from each stage of accumulator ACU is associated with a gate which closes a path from negative potential source 939 through an associated resistance to lead 940 when a steady state voltage is applied thereto. Accordingly, when the respective stages of the accumulator ACU are set to their "1" state, the gate associated therewith will be actuated to complete this path. For example, the (1) output lead of stage (1) of accumulator ACU is connected to gate G1, and when this stage is in its "1" state gate G1 will be actuated to close a path from potential source 939 through resistance R1 to lead 940. Similarly, when stage (2) is set to its "1" state, gate G2 will be actuated to complete a path from potential source 939 through resistance R2 to lead 940. It will be observed that the operation of the respective gates G1, G2, G4, G8 . . . G(N) changes the combination of resistances R1, R2, R4, R8 . . . R(N) which are connected in parallel between potential source 939 and lead 940. The values of resistances R1, R2, R4, R8 . . . R(N) are individually selected to provide advantageously a deflection current in vertical registry coil 936 which is related to the count accumulated in accumulator ACU.

One terminal of vertical registry coil 936 of flying spot scanner FSS is connected to negative potential source 937. The other terminal of coil 936 is connected via lead 941 to the left-hand terminal of variable resistance RC. The other terminal of variable resistance RC is connected to positive potential source 938. It will also be observed that lead 940 is terminated on the same left-hand terminal of resistance RC as lead 941. Accordingly, the potential at the point of intersection of leads 940 and 941 may be adjusted by varying resistance RC or by varying the parallel combination of resistances R1, R2, R4, R8 . . . R(N).

The current flow through vertical registry coil 936 is initially adjusted by variable resistance RC such that the electron beam of flying spot scanner FSS is centered to one side of the field. A current in the opposite direction is used to deflect the beam back in the other direction. This current is produced by voltage from source 939 through the selectable parallel combination of resistances R1, R2, R4, R8 . . . R(N) which, as pointed out above, is varied and depends upon the count accumulated in accumulator ACU. Thus the count registered in accumulator ACU is initially set to be somewhere in the midpoint of the total count that can be accumulated so that accumulator ACU can count up or down from this setting and move the scan centers of the electron beam of flying spot scanner FSS up or down correspondingly.

For example, assume that accumulator ACU contains eight binary stages and the count presently registered therein is 124 which in the binary system of notation corresponds to 01111100. Thus stages (64), (32), (16) not shown in FIG. 9, and stages (8) and (4) of accumulator ACU, will be set to their "1" state, and the associated gates G64, G32, G16 not shown in the drawing, and G8 and G4 will be operated. Accordingly the voltage applied to lead 940 will be proportional to the voltage drop through the parallel combination of resistances R64, R32, R16 not shown in the drawing, and R8 and R4.

Assume now that accumulator ACU receives a command from the above-described translation circuits to move the scan centers of the electron beam of flying spot scanner FSS down four increments. Assume further that the present count registered in accumulator ACU is 124 as assumed above. As indicated hereinbefore, when the translation circuits described above determine that the scan centers of the electron beam of flying spot scanner FSS are to be moved four increments, a signal is applied to the C4' lead and the DN lead. The signal applied to the DN lead will enable AND gates 943, 946 and 949 in stages (1), (2) and (4), respectively, of accumulator ACU and the corresponding AND gate in the successive stages of accumulator ACU. No further action takes place, however, because as indicated above no steady state signal voltage is applied to the other input of these respective AND gates. After the AND gates in accumulator ACU are enabled in response to the signal applied to the DN lead and in response to the signal applied to lead t(220), AND gate 933 will be actuated to apply a signal to the C4′ lead. The signal applied to the C4′ lead is applied to OR gate 947 in the input of stage (4) of accumulator ACU. The actuation of OR gate 947 in response to this signal will apply a signal to the input of stage (4) of accumulator ACU. Because stage (4) under the assumed accumulated count is set to its "1" state, it will be set to its "0" state in response to the signal applied to its input and will remove the steady state signal from the (1) output lead of stage (4) and hence open gate G4. The opening of gate G4 removes resistance R4 from the parallel combination of resistances connected between potential source 939 and lead 940. When stage (4) changes from its "1" state to its "0" state a signal pulse will be applied through condenser C(4)0 to the lower input of AND gate 948. However, because this AND gate is not enabled, a "borrow" signal is not propagated to the succeeding stages of accumulator ACU. Thus the count accumulated in accumulator ACU is 120 which in the binary system of notation corresponds to 01111000.

Assume now that the next command received by accumulator ACU from the translation circuits is another command to move the scan centers of the electron beam of flying spot scanner FSS down four increments. In a manner similar to that described above, the signal applied to the DN lead will enable the respective AND gates 943, 946, 949, et cetera, in each of the stages of accumulator ACU. When a signal is applied to lead *t*(220), AND gate 933 will be actuated and apply a signal to lead C4′. The signal applied to the C4′ lead causes the actuation of OR gate 947 which applies a signal to the input of stage (4) of accumulator ACU. As indicated above, stage (4) is now in its "0" state and accordingly the signal applied to its input will set this stage to its "1" state. When stage (4) is set to its "1" state, a "borrow signal" pulse will be applied through a condenser C(4)1 to the upper input of AND gate 949. This signal will cause the actuation of AND gate 949 which in turn will apply a signal to the input of stage (8) of accumulator ACU. Stage (8) of accumulator ACU will be switched from its "1" state to its "0" state and the count accumulated in accumulator ACU will be 116 which in the binary system of notation corresponds to 01110100.

With the count accumulated in accumulator ACU at 116 as described above, assume now that the translation circuits provide a command to move the scan centers of the electron beam of flying spot scanner FSS up one increment. As described above, this command will be represented by a signal applied to the UP lead and a signal applied to the C1′ lead. The signal on the UP lead will enable AND gates 942, 945, 948 in stages (1), (2), and (4), respectively, of accumulator ACU and the corresponding AND gate of successive stages of accumulator ACU not shown in the drawing. When AND gate 935 is actuated in response to the signal applied to lead *t*(220) a signal is applied to lead C1′. The signal applied to the C1′ lead is then applied to the input of stage (1) of accumulator ACU. Under the assumed count 116, stage (1) will be set to its "0" state, and accordingly the signal applied to the C1′ lead after being delayed in delay circuit DU1 will set stage (1) of accumulator ACU to its "1" state. When stage (1) is set from its "0" to its "1" state, a "carry signal" is applied from the (1) output lead of stage (1) through condenser C(1)1 to an input of AND gate 943. However, AND gate 943 is not enabled at this time and accordingly no "carry signal" is propagated to the successive stages of accumulator ACU. Thus the count accumulated in accumulator ACU is 117 which in the binary system of notation corresponds to 01110101.

Assume now that a command to move the scan centers of the electron beam of flying spot scanner FSS up two increments is received from the above-described translation circuits. As indicated above, this is represented by a signal applied to the UP lead and a signal applied to the C2′ lead. The signal on the UP lead will, as described above, enable AND gates 942, 945, 948, et cetera, in each of the stages of accumulator ACU. When AND gate 934 is actuated in response to the signal applied to lead *t*(220), a signal is applied to lead C2′. The signal applied to the C2′ lead causes the actuation of OR gate 944 which applies a signal to the input of stage (2) of accumulator ACU. Under the assumed count, stage (2) is now set to its "0" state and accordingly the signal applied to its input from the output of OR gate 944 will set this stage to its "1" state. When stage (2) is set from its "0" state to its "1" state, a "carry signal" pulse will be applied through condenser C(2)1 in the (1) output lead of stage (2) to an input of AND gate 946. However, AND gate 946 is not enabled at this time and no "carry signal" is propagated to the succeeding stages of accumulator ACU. Thus the count accumulated in accumulator ACU will be 119 which in the binary system of notation corresponds to 01110111.

With the count in accumulator ACU standing at 119, assume that the next command received by accumulator ACU from the translation circuits is to move the scan centers of the electron beam of flying spot scanner FSS up one increment. As indicated above, this is represented by a signal applied to the UP lead and a signal applied to the C1′ lead. The signal on the UP lead will enable the respective AND gates 942, 945, 948, et cetera, in each of the stages of accumulator ACU. The signal applied to the C1′ lead after the actuation of AND gate 935 will trigger stage (1) of accumulator ACU from its "1" to its "0" state. When this occurs a "carry signal" pulse is applied through condenser C(1)0 in the (0) output lead of stage (1) to actuate AND gate 942 which was enabled by the signal applied to the UP lead. The actuation of AND gate 942 will in turn cause the actuation of OR gate 944. The actuation of OR gate 944 will apply a signal to the input of stage (2) of accumulator ACU to switch this stage from its "1" state to its "0" state. When stage (2) is switched from its "1" to its "0" state, a "carry signal" pulse is applied through condenser C(2)0 in its (0) output lead to actuate AND gate 945 which as indicated above was enabled by the signal applied to the UP lead. The actuation of AND gate 945 will in turn apply a signal to actuate OR gate 947. The actuation of OR gate 947 will apply a signal to the input of stage (4) of accumulator ACU. This signal will switch stage (4) from its "1" state to its "0" state and will apply a "carry signal" through condenser C(4)0 to an input of AND gate 948 which was enabled by the signal on the UP lead. The actuation of AND gate 948 will apply a signal to the input of stage (8) of accumulator ACU and stage (8) will be switched from its "0" state to its "1" state. The switching of stage (8) from its "0" to its "1" state will apply a "carry signal" from the (1) output lead of stage (8) to an AND gate not shown in the drawing which is enabled only when a signal is applied to the DN lead, and accordingly no further "carry signals" are propagated to the successive stages of accumulator ACU. Thus the count accumulated in accumulator ACU is 120 which in the binary system of notation corresponds to 01111000.

With the count standing in accumulator ACU at 120, assume now that the next command received by accumulator ACU from the translation circuits is a command to move the scan centers of the electron beam of flying spot scanner FSS down two increments. As indicated above, this is represented by a signal applied to the DN lead and the C2′ lead. The signal on the DN lead will enable the respective AND gates 943, 946, 949, et cetera, in each of the stages of accumulator ACU. The signal applied to the C2′ lead causes the actuation of OR gate 944. The actuation of OR gate 944 applies a signal to the input of stage (2) of accumulator ACU. As indicated above, stage (2) is now in its "0" state and accordingly the signal applied to its input will set this stage to its "1" state. When stage (2) of accumulator ACU is switched from its "0" state to its "1" state, a "borrow signal" pulse is applied through condenser C(2)1 to an input of AND gate 946. AND gate 946, being enabled by the signal on lead DN, will be actuated in response to this "borrow signal" and will in turn cause the actuation of OR gate 947. The actuation of OR gate 947 will in turn apply a signal to the input of stage (4) of accumulator ACU. Stage (4) is now in its "1" state and accordingly, in response to this signal, will be switched to its "0" state. When stage (4) of accumulator ACU is switched from its "1" state to its "0" state, a "borrow signal" pulse is applied through condenser C(4)0 to an input of AND gate 948 which may be actuated only when an enabling signal is applied to the UP lead. Accordingly, no further "borrow signals" are propagated to the successive stages of accumulator ACU and the count accumulated in accumlator ACU will be 118 which in the binary system of notation corresponds to 011110110.

It is believed that the examples presented above clearly illustrate the manner in which accumulator ACU operates in response to the respective command signals, up 1, 2 or 4, and down 1, 2 or 4, to control the current through vertical registry coil 936 to position the scan centers of the electron beam of flying spot scanner FSS. Thus, if the scan centers are a considerable distance from the proper position, accumulator ACU will receive several successive commands to move four increments; as the scan centers more nearly approach their correct position, the accumulator ACU will receive several successive commands to move two increments; and finally, as the scan centers closely approach their proper position, the accumulator ACU will receive successive commands to move only one increment. As indicated above, the size of the increments by which the scan centers are moved may advantageously be adjusted to be as fine or as coarse as required and any number of increments may be utilized. When the scan centers of the electron beam of flying spot scanner FSS are properly positioned on the guide lines, no command function signals are given accumulator ACU and accordingly the current in the vertical registry coil 936 of flying spot scanner FSS is not changed. When it is determined that the scan centers are not properly located, however, the appropriate signals as described above will cause the current in the vertical registry coil 936 to be changed to move the scan centers to the required position.

A focus and centering coil 950 is also provided on flying spot scanner FSS as shown in FIG. 9 and is utilized in the manner known in the art in conjunction with lens system SL shown in FIG. 4 to focus the light spot of flying spot scanner FSS on the form or paper upon which the characters to be recognized are written. Coil 950 is also advantageously utilized in the manner known in the art to control the rough centering of the electron beam of flying spot scanner FSS in the center of the face of the cathode ray tube.

CONCLUSION

What has been described hereinbefore is a specific illustrative embodiment of the principles of the present invention. It is to be understood that numerous other arrangements of physical parts and different component parts may be utilized with equal advantage. For example, it is readily appreciated that the electron beam of flying spot scanner FSS may be electrostatically controlled rather than magnetically controlled as described above. It is also possible to obtain the deflection voltage for generating the radial scans of the flying spot scanner from a resistor network instead of a sine wave generator as described above and is known in the art. Furthermore, it is to be understood that the number of radial scans made from each of the two scan centers may be advantageously adjusted to meet a specific character recognition problem or to meet a required speed of recognition. Thus the clock pulse frequency of clock pulse source 600 and the number of stages in binary counter BC1 shown in FIG. 6 may be selected to meet specific requirements. It is also to be understood that the amount of integration provided by binary counters BC2 and BC3*a* through BC3*h* may advantageously be adjusted to meet specific requirements. Furthermore, the feed rate at which carriage CR shown in FIG. 4 moves the characters to be recognized through the scanner pattern may advantageously be adjusted to meet specific character recognition speeds.

It is to be further understood that the number of criterion areas per scan cycle both in the top scan and the bottom scan may be increased or decreased to meet specific requirements and, by utilizing additional criterion areas in the scan cycle, the system disclosed herein may be readily extended to read alphabetical letters as well as Arabic numerals. This, of course, will require an increase in the logic provided to recognize the traversals of criterion areas. It will also be appreciated that phototransistors may be utilized to detect the light reflections of the light spot of flying spot scanner FSS from the field of the characters in place of the photomultipliers as described above.

Accordingly, it is to be understood that the abovedescribed arrangements are illustrative of the application of the principles of the present invention. Numerous other arrangements may be devised by those skilled in the art without departing from the spirit and scope of the invention.

What is claimed is:

1. In a character recognition system the combination comprising scanning means for scanning a field which includes a character to be recognized, means providing relative movement of said field with respect to said scanning means, means for controlling said scanning means to scan repeatedly said field in a bipolar radial scan pattern as said field moves with respect thereto, said pattern comprising a plurality of radial criterion scan areas extending from two centers, sensing means operative to provide an output signal when a portion of said character is sensed in any of said criterion scan areas, and means responsive to the output signals from said sensing means to provide a manifestation indicative of the identity of the character scanned.

2. In a character recognition system the combination comprising scanning means for scanning a field which includes a character to be recognized, first means controlling said scanning means to make a succession of radial scans from a first predetermined point on said field, and second means controlling said scanning means to make a succession of radial scans from a second predetermined point on said field.

3. The combination defined in claim 2 in combination with means controlling said first and said second means for alternately repeating said succession of radial scans from said first point and said second point, respectively.

4. In a character recognition system the combination comprising scanning means for scanning a field which includes a character to be recognized, means controlling said scanning means to make a plurality of radial scans from a first center, means controlling said scanning means to make a plurality of radial scans from a second center, each of said radial scans from said first center and said second center being angularly displaced from the preceding one of said radial scans by a predetermined number of degrees, and means including said radial scans for defining a predetermined plurality of radial criterion scan areas extending from said two centers.

5. The combination defined in claim 4 wherein said last named means comprises pick-up means providing an output signal when said scanning means traverses a portion of said character, gate means connected to said pickup means, and means for actuating said gate means during predetermined adjacent ones of said radial scans from said first and said second centers.

6. In a character recognition system the combination comprising scanning means for scanning a field which includes a plurality of guide lines and a character to be recognized, means controlling said scanning means to make successively a plurality of radial scans from a common center on a first of said guide lines, means controlling said scanning means to make successively a plurality of radial scans from a common center on a second of said guide lines, means controlling said two last named means for alternately repeating the plurality of radial scans from said first and said second guide lines, respectively, each of said radial scans from said first and said second guide lines being angularly displaced from the preceding one of said radial scans by a predetermined number of degrees, pick-up means providing an output signal when said scanning means traverses a portion of said character, gate means connected to said pick-up means, and means for actuating said gate means during predetermined adjacent ones of said radial scans from said first and said second guide lines.

7. In a character recognition system the combination comprising scanning means for scanning a field which includes a character to be recognized, first control means operative to control said scanning means to define successively from a first common center a predetermined plurality of radial criterion scan areas, second control means operative to control said scanning means to define successively from a second common center a predetermined plurality of radial criterion scan areas, means individual to each of said criterion scan areas from said first and said second centers operative to provide a signal when a portion of said character is sensed in the one of said criterion scan areas individual thereto, and means responsive to the output signals from said last named means to provide a manifestation indicating the identity of the character scanned.

8. The combination defined in claim 7 in combination with means providing relative movement of said field with respect to said scanning means, and means for alternately operating said first control means and said second control means to define repeatedly the successive radial criterion scan areas from said first and said second centers, respectively.

9. The combination defined in claim 8 in combination with means controlling said scanning means to maintain said first center and said second center on predetermined guide lines in said character field as said field moves with respect to said scanner.

10. In a character recognition system the combination comprising scanning means for scanning a field which includes a character to be recognized, control means controlling said scanning means to define a criterion scan area on said field, said criterion scan area being defined by a predetermined number of successive scans of said scanning means each separated from the other a predetermined distance, pick-up means providing a signal pulse when any of said scans traverses a mark on said field, means for counting said signal pulses, and means providing an output signal when a predetermined number of said pulses are counted by said counting means.

11. The combination defined in claim 10 in combination with means controlled by said control means and operative in response to the last scan of said successive scans defining said criterion scan area for resetting said counting means.

12. In a character recognition system the combination comprising scanning means for scanning a field which includes a character to be recognized, control means controlling said scanning means to define a radial criterion scan area on said field, said criterion scan area being defined by a predetermined plurality of successive radial scans of said scanning means from a common center each displaced from the preceding scan a predetermined angle, pick-up means operative on each of said radial scans to provide a signal pulse in response to the traversal by said scanning means of a mark on said field, means for counting the number of said signal pulses from said pick-up means for the radial scans defining said criterion area, means operative when a predetermined count is made by said counting means to provide an output signal, and means controlled by said control means and operative in response to the last radial scan of said successive radial scans defining said radial criterion scan area for resetting said counting means.

13. In a character recognition system the combination comprising scanning means for scanning a field which includes a character to be recognized, means providing relative movement of said field with respect to said scanning means, means controlling said scanning means to scan said field in a predetermined criterion scan area, means controlling said last named means to repeatedly scan said criterion scan area as said field moves with respect to said scanning means, pick-up means for producing a signal pulse when said scanning means senses a mark on said field, and means controlled by said pick-up means for providing an output signal when a mark on said field is sensed in each of a predetermined number of successive scans of said criterion area.

14. The combination defined in claim 13 wherein said last named means comprises pulse counting means, means applying the signal pulses from said pick-up means to said counting means, and means controlled by said pick-up means and operative when a mark on said field is not sensed during any one of said successive scans of said criterion area for resetting said counting means.

15. In a character recognition system the combination comprising scanning means for scanning a field which includes a character to be recognized, means providing relative movement of said field with respect to said scanning means, control means controlling said scanning means to define repeatedly a criterion scan area on said field as said field moves with respect to said scanning means, each repetition of said criterion scan area being defined by a predetermined number of successive adjacent scans of said scanning means, pick-up means operable when any of said scans of said scanning means traverses a mark on said field, means controlled by said pick-up means and operable to provide a first signal when a predetermined number of said scans defining any repetition of said criterion scan area traverse a mark on said field, and means connected to said last named means and operative when said first signal is received therefrom for a predetermined number of successive repetitions of said criterion scan area to provide a second signal.

16. In a character recognition system the combination comprising scanning means for scanning a field which includes a character to be recognized, means controlling said scanning means to define successively from a common center a predetermined plurality of radial criterion scan areas, means individual to each of said radial criterion scan areas and operative to provide a signal when a portion of said character is sensed therein, detecting means controlled by said last named means and operative in response to the sensing of a closed configuration of said character, means controlled by said detecting means when operated for determining the number of corners in said closed configuration, and means including said last named means providing a manifestation indicative of the identity of the character scanned.

17. In a character recognition system the combination comprising scanning means for scanning a field which includes a character to be recognized, first means controlling said scanning means to define successively from a first common center a first predetermined plurality of radial criterion scan areas, second means controlling said scanning means to define successively from a second common center a second predetermined plurality of radial criterion scan areas, pick-up means operative to provide a signal when a portion of said character is sensed in any of said radial criterion scan areas, detecting means controlled by said pick-up means and operative in response to the sensing of a closed configuration of said character surrounding at least one of said first and said second centers, means controlled by said detecting means and operative to provide an output signal when said closed configuration contains a predetermined number of corners, and means responsive to said output signal and to the signals from said pick-up means to provide a manifestation indicating the identity of the character scanned.

18. The combination defined in claim 17 wherein said detecting means comprises gate means responsive to a signal from said pick-up means in each of said predetermined plurality of radial criterion scan areas in at least one of two said pluralities of said radial criterion scan areas for providing a signal manifestation indicating the sensing of a closed configuration of said character.

19. The combination defined in claim 18 wherein said means controlled by said detecting means comprises means controlled by said signal manifestation from said gate means for producing a signal having a cusp for each corner contained in said closed configuration, and means controlled by said signal and responsive to a predetermined number of cusps therein for providing an output signal.

20. In a character recognition system the combination comprising scanning means for scanning a field which includes a character to be recognized, control means for controlling said scanning means to make repeatedly a plurality of successive radial scans from a common point on said field, each of said scans being angularly displaced from the preceding one of said scans by a predetermined number of degrees, means controlled by said control means for successively defining a predetermined plurality of radial criterion scan areas extending from said common point on said field, pick-up means providing a signal pulse when a mark on said field is traversed by any of said radial scans, detecting means controlled by said pick-up means for detecting the presence of a portion of said character in any of said radial criterion scan areas, means controlled by said detecting means and operative when a portion of said character is detected in all of said radial criterion scan areas to provide a signal manifestation indicating the detection of a closed configuration of said character, means responsive to said signal manifestation and controlled by said control means and said pick-up means for producing a succession of voltage pulses, each of said pulses produced in response to a different one of said radial scans, the amplitude of each of said pulses being proportional to the radial distance from said point on said field to the portion of said closed configuration traversed by the one of said radial scans producing it, means responsive to said succession of voltage pulses for providing a signal manifestation indicating the identity of the closed configuration.

21. In a character recognition system the combination comprising scanning means for scanning a field which includes a character to be recognized, control means for controlling said scanning means to make a first plurality of successive radial scans from a first common center and successively a second plurality of successive radial scans from a second common center, each of said scans being angularly displaced from the preceding one of said scans by a predetermined number of degrees, means controlled by said control means for successively defining a predetermined plurality of radial criterion scan areas extending from a first point on said field and a predetermined plurality of radial criterion scan areas extending from a second point on said field, pick-up means providing a signal pulse when a mark on said field is traversed by any of said radial scans, detecting means controlled by said pick-up means for detecting the presence of a portion of said character in any of said radial criterion scan areas, means controlled by said detecting means and operative when a portion of said character is detected in all of the successively defined radial criterion scan areas extending from at least one of said two points on said field to provide a signal manifestation indicating the detection of a closed configuration of said character, means responsive to said signal manifestation and controlled by said control means and said pick-up means for producing a succession of voltage pulses, each of said pulses produced in response to a different one of said radial scans made by said scanning means from said one of said two points on said field, the amplitude of each of said voltage pulses being proportional to the radial distance from said one of said two points on said field to the portion of said closed configuration traversed by the one of said radial scans producing it, means responsive to said succession of voltage pulses for determining the number of corners in said closed configuration, and means controlled by said last named means and said detecting means to provide a signal manifestation indicating the identity of the character scanned.

22. In a character recognition system the combination comprising scanning means for scanning a field which includes a plurality of guide lines and a character to be recognized, means providing relative movement of said field with respect to said scanning means, means controlling said scanning means to scan said field repeatedly as said field moves with respect to said scanning means in a bipolar radial scan pattern comprising a plurality of radial criterion scan areas extending from two centers on said field, means controlling said scanning means to maintain the position of said scan pattern on said field so that the two centers thereof are located on a predetermined two of said guide lines as said field moves with respect to said scanning means, sensing means operative to provide a signal pulse when a portion of said character is sensed in any of said radial criterion scan areas, a plurality of output means controlled by said sensing means, each individual to a particular one of said criterion scan areas, each of said output means operative to provide an output signal when a portion of said character is sensed in the criterion scan area individual thereto for a predetermined number of successive repetitions of said scan pattern, and means responsive to said output signal from said plurality of output means to provide a manifestation indicative of the identity of the character scanned.

23. In a character recognition system the combination comprising scanning means for scanning a field which includes a plurality of guide lines and a character to be recognized, means for controlling said scanning means to scan repeatedly said field in a bipolar radial scan pattern comprising a plurality of radial criterion scan areas extending from two centers, and control means controlling said scanning means to position said scan pattern on said field so that the two centers thereof are located on a predetermined two of said guide lines.

24. The combination defined in claim 23 in combination with means moving said field with respect to said scanning means, and means controlling said control means to maintain said two centers of said scan pattern on said predetermined two of said guide lines as said field moves with respect to said scanning means.

25. In a character recognition system the combination comprising scanning means for scanning a field which includes a plurality of guide lines and a character to be recognized, means controlling said scanning means to make a succession of radial scans from a common center each angularly displaced from the preceding one by a predetermined number of degrees, means controlling said last named means and said scanning means for alternately repeating said succession of radial scans from a first center and a second center, respectively, pick-up means operative to produce a signal pulse in response to the traversal of each of said guide lines on said field by any of said radial scans, determining means controlled by said pick-up means for determining the relative position of said two centers of said radial scans with respect to a predetermined two of said guide lines, position control means responsive to said determining means for controlling said scanning means to position said two centers of said radial scans on said predetermined two of said guide lines.

26. The combination defined in claim 25 wherein said determining means comprises first counting means, first gate means connected to said pick-up means and operative to gate the signal pulses to said first counting means produced by said pick-up means in response to the traversal of said plurality of guide lines on said field for a predetermined one of said radial scans from said first center, second counting means, second gate means connected to said pick-up means and operative to gate the signal pulses to said second counting means produced by said pick-up means in response to the traversal of said plurality of guide lines on said field for a predetermined one of said radial scans from said second center, translating means connected to said first counting means and said second counting means and responsive to the respective counts therein for indicating the relative position of said two centers of said radial scans with respect to said predetermined two of said guide lines.

27. The combination defined in claim 26 in combination with means controlled by said translating means for producing a first signal indicating the direction of movement of said two centers of said radial scans, and means controlled by said translating means for producing a second signal indicating a degree of movement of said two centers of said radial scans.

28. The combination defined in claim 27 wherein said position control means comprises means controlling said scanning means to position said two centers of said radial scans in a predetermined number of finite incremental steps from a first location on one side of said predetermined two of said guide lines to a second location on the opposite side of said predetermined two of said guide lines, and means responsive to said first signal and said second signal for controlling said last named means to move said two centers of said radial scans in the direction indicated by said first signal and a number of said incremental steps indicated by said second signal.

29. In a character recognition system the combination comprising scanning means for scanning a field which includes a plurality of guide lines and a character to be recognized, means for moving said field with respect to said scanning means, means for controlling said scanning means to scan repeatedly said field in a bipolar radial scan pattern as said field moves with respect to said scanning means, said bipolar radial scan pattern comprising a plurality of radial criterion scan areas extending from two centers, position control means controlling said scanning means to position said two centers of said bipolar radial scan pattern at a selected one of a predetermined plurality of positions extending from a first location on one side of a predetermined two of said guide lines to a second location on the opposite side of said predetermined two of said guide lines, said plurality of positions being consecutively numbered from said first location to said second location, pick-up means operative to produce a signal pulse in response to the sensing of each of said plurality of guide lines in certain of said radial criterion scan areas, determining means controlled by said pick-up means for repeatedly determining the relative position of said two centers of said bipolar radial scan pattern with respect to said predetermined two of said guide lines as said field moves with respect to said scanning means, and means controlled by said determining means for repeatedly controlling said position control means to position said two centers of said bipolar radial scan pattern to selected ones of said plurality of positions between said first location and said second location.

30. The combination defined in claim 29 wherein said last named means comprises register means for registering the number of a selected one of said plurality of positions to which said two centers of said bipolar radial scan pattern are to be positioned, means controlled by said register means for controlling said position control means to move said two centers of said bipolar radial scan pattern to the selected position number registered in said register means, and means responsive to said determining means for changing the number registered in said register means.

31. The combination defined in claim 30 in combination with second pick-up means operative to produce a signal in response to the sensing of a portion of said character in any of said radial criterion scan areas, and means responsive to the signals from second pick-up means to provide a manifestation indicating the identity of the character scanned.

References Cited in the file of this patent

UNITED STATES PATENTS

| | | |
|---|---|---|
| 2,741,312 | Johnson | Apr. 10, 1956 |
| 2,838,602 | Sprick | June 10, 1958 |
| 2,919,426 | Rohland | Dec. 29, 1959 |
| 2,928,074 | Sutter | Mar. 8, 1960 |